US010203397B2

(12) United States Patent
Sendonaris et al.

(10) Patent No.: US 10,203,397 B2
(45) Date of Patent: Feb. 12, 2019

(54) METHODS AND APPARATUS FOR IMPROVING TIME OF ARRIVAL DETERMINATION

(71) Applicant: NextNav, LLC, Sunnyvale, CA (US)

(72) Inventors: Andrew Sendonaris, Los Gatos, CA (US); Norman F. Krasner, Redwood City, CA (US); Jagadish Venkataraman, San Jose, CA (US); Chen Meng, Beijing (CN)

(73) Assignee: NextNav, LLC, Sunnyvale, CA (US)

( * ) Notice: Subject to any disclaimer, the term of this patent is extended or adjusted under 35 U.S.C. 154(b) by 907 days.

(21) Appl. No.: 14/207,351

(22) Filed: Mar. 12, 2014

(65) Prior Publication Data

US 2014/0266904 A1  Sep. 18, 2014

Related U.S. Application Data

(60) Provisional application No. 61/786,474, filed on Mar. 15, 2013.

(51) Int. Cl.
*G01S 1/02* (2010.01)
*G01S 1/04* (2006.01)
(Continued)

(52) U.S. Cl.
CPC ............ *G01S 1/02* (2013.01); *G01S 1/04* (2013.01); *G01S 5/0215* (2013.01); *G01S 19/22* (2013.01); *G01S 5/0236* (2013.01)

(58) Field of Classification Search
CPC .......... G01S 1/24; G01S 19/22; G01S 5/0236; G01S 1/02; G01S 1/42; G01S 5/0215; G01S 5/0278; G01S 5/14; G01S 5/021; G01S 5/0221; G01S 7/354; G01S 3/74; G01S 5/0263; G01S 19/05; G01S 19/11; G01S 5/0242; H04W 64/00; H04B 17/345; H04B 7/0854; H01Q 3/2605; H04J 11/0036
(Continued)

(56) References Cited

U.S. PATENT DOCUMENTS 7,295,159 B1 * 11/2007 Belcea .................. G01S 5/021
342/387
7,391,368 B1 * 6/2008 Gao ...................... G01S 5/0215
342/387
(Continued)

FOREIGN PATENT DOCUMENTS

CN 102203634 A 9/2011
CN 102204396 A 9/2011
(Continued)

OTHER PUBLICATIONS

U.S. Patent Office, Office Action of U.S. Appl. No. 14/207,432, 66 pages (dated Oct. 7, 2016).
(Continued)

*Primary Examiner* — Bernarr E Gregory
*Assistant Examiner* — Nuzhat Pervin

(57) ABSTRACT

Devices, systems, and methods for improving performance in positioning systems. Performance may be improved using disclosed signal processing methods for separating eigenvalues corresponding to noise and eigenvalues corresponding to one or more direct path signal components or multipath signal components.

14 Claims, 14 Drawing Sheets

(51) Int. Cl.
G01S 5/02 (2010.01)
G01S 19/22 (2010.01)
(58) Field of Classification Search
USPC .......................................................... 342/385
See application file for complete search history.

(56) References Cited

U.S. PATENT DOCUMENTS

| | | | | |
|---|---|---|---|---|
| 8,380,154 | B2* | 2/2013 | Lindqvist | H04B 7/0854 |
| | | | | 375/316 |
| 8,423,047 | B1* | 4/2013 | Zang | G01S 5/0242 |
| | | | | 370/328 |
| 8,643,540 | B2* | 2/2014 | Pattabiraman | G01S 19/11 |
| | | | | 342/357.29 |
| 2005/0175038 | A1* | 8/2005 | Carlson | G01S 5/14 |
| | | | | 370/503 |
| 2007/0018891 | A1 | 1/2007 | Golden | |
| 2007/0099633 | A1* | 5/2007 | Bamberger | H04W 64/00 |
| | | | | 455/456.2 |
| 2008/0130794 | A1* | 6/2008 | Chong | G01S 5/0221 |
| | | | | 375/317 |
| 2008/0218403 | A1* | 9/2008 | Lee | G01S 5/0215 |
| | | | | 342/118 |
| 2008/0278368 | A1* | 11/2008 | Noda | G01S 7/354 |
| | | | | 342/133 |
| 2009/0195456 | A1* | 8/2009 | Gezici | G01S 5/0221 |
| | | | | 342/387 |
| 2010/0015935 | A1* | 1/2010 | Zeng | H04B 17/345 |
| | | | | 455/206 |
| 2010/0238029 | A1 | 9/2010 | Inomata | |
| 2011/0012787 | A1* | 1/2011 | Na | H01Q 3/2605 |
| | | | | 342/373 |
| 2011/0111751 | A1* | 5/2011 | Markhovsky | G01S 3/74 |
| | | | | 455/423 |
| 2012/0038506 | A1 | 2/2012 | Kanamoto | |
| 2012/0108194 | A1* | 5/2012 | Lindqvist | H04B 7/0854 |
| | | | | 455/296 |
| 2013/0057434 | A1* | 3/2013 | Krasner | G01S 5/0263 |
| | | | | 342/387 |
| 2013/0063301 | A1* | 3/2013 | Pattabiraman | G01S 19/11 |
| | | | | 342/357.29 |
| 2013/0063307 | A1* | 3/2013 | Krasner | G01S 19/05 |
| | | | | 342/387 |
| 2014/0098743 | A1* | 4/2014 | Sud | H04J 11/0036 |
| | | | | 370/328 |
| 2014/0266905 | A1* | 9/2014 | Sendonaris | G01S 1/02 |
| | | | | 342/385 |

FOREIGN PATENT DOCUMENTS

| | | |
|---|---|---|
| EP | 2932740 A1 | 10/2015 |
| GB | 2422064 A | 7/2006 |
| WO | 00/34799 A1 | 6/2000 |
| WO | 2010030825 A1 | 3/2010 |
| WO | 2010134933 A1 | 11/2010 |
| WO | 2014093400 A1 | 6/2014 |

OTHER PUBLICATIONS

Information about Related Patents and Patent Applications, see the section attached hereto entitled Related Patents and Patent Applications for further information.
Form PCT/ISA/220, PCT/US2014/024979, "Notification of Transmittal of the International Search Report and the Written Opinion of the International Searching Authority, or the Declaration", 1 page; Form PCT/ISA/210, PCT/US2014/024979, "International Search Report", 4 pages; Form PCT/ISA/237, PCT/US2014/024979, "Written Opinion of the International Searching Authority", 7 pages.
U.S. Appl. No. 14/207,351, filed Mar. 12, 2014, Sendonaris.
U.S. Appl. No. 14/207,432, filed Mar. 12, 2014, Sendonaris.
Chinese Patent Office, roughly-translated portions of Office Action of Appl. No. 201480012850.1, including claims under review, 10 pages, dated Oct. 25, 2016.
Applicant, Response to Office Action of Appl. No. 14724542.7, 91 pages (dated Jun. 3, 2016).
European Patent Office, Search Report of Appl. No. 14721063.7, 7 pages (dated Sep. 23, 2016).
Chinese Patent Office, Office Action of Appl. No. 201480012850.1, including roughly-translated parts of the Office Action, 19 pages, dated Oct. 25, 2016.
Yanglingling, "Study on Precise TOA Ranging and Positioning Using IR_UWB Wireless Sensor Network", Information Science and Technology, full-test database of master degree theses of Chinese excellent master, ISSN 1674-0246, including roughly-translated parts of the reference, 31 pages, edition 08 2011.
Chinese Patent Office, Office Action of Appl. No. 201480012850.1, 14 pages, dated Oct. 25, 2016.
Yanglingling, "Study on Precise TOA Ranging and Positioning Using IR_UWB Wireless Sensor Network", Information Science and Technology, full-test database of master degree theses of Chinese excellent master, ISSN 1674-0246, 20 pages, edition 08 2011.

\* cited by examiner

Example Location/Position System Embodiment

Example Location/Position User Device (Receiver)

*Example Output Signal with Direct Path Largest*

*Example Output Signal with Weak Direct Path*

*Example Output Signal with Direct and First Multipath Heavily Overlapped*

Eigenvalue Statistics; Noise Only, I,Q Variances Equal 1

*Example Pseudospectrum Amplitude with Multipath,
First Peak Corresponding to Direct Signal*

*Example Pseudospectrum Amplitude with Multipath, First Peak Corresponding
to Direct Signal, and Direct Signal Weaker than Other Reflected Signals*

METHODS AND APPARATUS FOR IMPROVING TIME OF ARRIVAL DETERMINATION

CROSS REFERENCE TO RELATED APPLICATIONS

This application claims priority under 35 U.S.C. § 119(e) to U.S. Provisional Patent Application Ser. No. 61/786,474, filed Mar. 15, 2013, entitled METHODS AND APPARATUS FOR IMPROVING TIME OF ARRIVAL DETERMINATION IN WIDE AREA POSITIONING SYSTEMS, the content of which is hereby incorporated by reference herein in its entirety for all purposes.

FIELD

This disclosure relates generally to positioning systems. More specifically, but not exclusively, the disclosure relates to signal processing for determining the location of a receiver in a wide area positioning system (WAPS).

BACKGROUND

Radio-based systems such as LORAN, GPS, GLONASS, and the like have been used to provide position information for persons, vehicles, equipment, and the like. In challenging environments, these systems do, however, have limitations associated with factors such as signal blockage and multipath. Accordingly, there is a need for positioning systems that account for signal blockage, multipath or other problems with existing systems and methods.

SUMMARY

Aspects of this disclosure relate generally to signal processing associated with determining a receiver's position. Position determination may be based on distance estimates that may be determined based on eigenvalues determined from an estimated covariance of a positioning signal, based on times of arrival estimated using different estimation methods depending a statistic of a positioning signal, based on a value of a quality metric associated with a time of arrival, or based on other approaches. Various additional aspects, features, and functions are described below in conjunction with the appended Drawings.

DETAILED DESCRIPTION OF EMBODIMENTS

Figure 1:
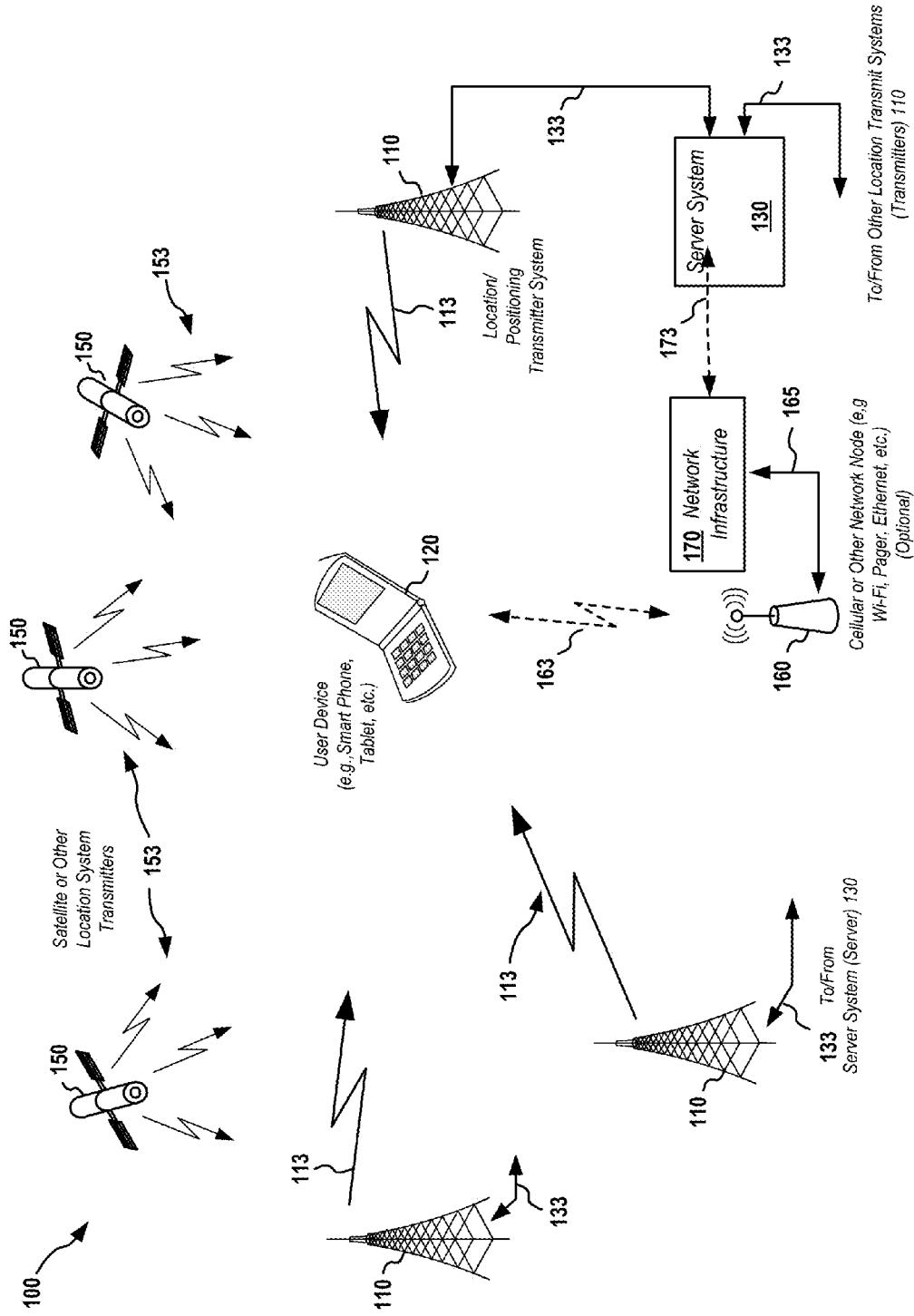
FIG. 1 illustrates details of a terrestrial location/positioning system on which embodiments may be implemented.

This disclosure relates generally to positioning systems. More specifically, but not exclusively, the disclosure relates to devices, systems and methods for determining the position of a receiver using a transmitter array in communication with the receiver.

One embodiment includes a method of determining location information associated with a receiver (e.g., a cellular phone, tablet, or other mobile or computing device). The method may include receiving at least one of a direct path signal component and one or more multipath signal components associated with a positioning signal transmitted by a transmitter. The term "component" when referencing a signal may refer to some or all of a signal. For example, a signal component may refer to part or all of the positioning signal. In some cases, the direct path signal component may be stronger than the multipath signal components in some environments. Alternately, one or more of the multipath signal components may be stronger than the direct path signal component. The direct and multipath components may heavily overlap one another in times of arrival at a receiver. The method may further include computing an estimated covariance of the received positioning signal, determining an eigenvalue decomposition of the estimated covariance, and estimating a statistical distribution of the eigenvalues. The method may further include a method for separating the set of eigenvalues, based on a threshold, into a first subset of eigenvalues corresponding to a transmitted signal including the direct path signal component and the multipath signal components and a second set of eigenvalues corresponding to noise components. The threshold may be based at least in part on the estimated statistical distribution. One or both of the two sets of eigenvalues and associated eigenvectors may be used to estimate a time of arrival of the direct path signal component, or the one or more multipath signal components. The method may further include determining, based at least in part on one or both of the two sets of eigenvalues and associated eigenvectors, a distance estimate between the transmitter and the receiver. The determination of a distance estimate may be based at least in part on the separation of the eigenvalues into the two sets. The first set of eigenvalues and associated eigenvectors (corresponding with the estimated transmitted signal) may be used to estimate the time of arrival and/or distance. In a complementary implementation, the second set of eigenvalues and associated eigenvectors (corresponding with the estimated noise) may be used to estimate the time of arrival and/or distance.

In one embodiment, the location of the receiver may be determined based on utilizing the distance estimate between the receiver and the transmitter, in addition to utilizing additional distance estimates determined between two or more additional transmitters and the receiver. Determining the location via multiple distance measurements is sometimes termed trilateration. In the following discussion the term triangulation is also given the same meaning and hence the terms trilateration and triangulation are used interchangeably. In some literature the term triangulation refers to use of measuring angles between transmitters and a receiver to determine position. This distinction is not used herein, and in fact many methods may be used to determine the position of a receiver from multiple distance measurements, for example use of intersecting circles, intersection hyperbola, and the like.

One embodiment includes a method of determining location information associated with a receiver. The method may include receiving at least one of a direct path signal component and one or more multipath signal components. The method may include computing a statistic of the received positioning signal, computing an estimated covariance of the received positioning signal, determining an estimated time of arrival of the direct path or multipath signals using a first method if the statistic is within a first range, determining an estimated time of arrival of the direct path or multipath signals using a second method if the statistic is within a second range, and determining a distance estimate between the transmitter and the receiver based at least in part on the estimated time of arrival. The first method may, for example, include use of an information theoretic criterion for estimating a number of eigenvalues associated with a signal subspace of the estimated covariance and the number of eigenvalues associated with the noise subspace. The estimated time of arrival may be based on the eigenvectors associated with these subspaces. The first or second methods may include use of a statistic of the estimated covariance to estimate a number of eigenvalues in a positioning signal subspace of the estimated covariance and the number of signals associated with the noise subspace, where the estimated time of arrival is based on the eigenvectors associated with these subspaces. The statistic may be a measure of a signal-to-noise ratio of the received positioning signal. The method may further include determining, based in part on the distance estimate, a location of the receiver, and providing the location as an output.

One embodiment includes a method for determining location information associated with a receiver. The method may further include determining a set of potential times of arrival of signal components, and selecting a time of arrival from the set of potential times of arrival. The method may further include determining the value of a quality metric based on information associated with the selected first time of arrival. The method may further include removing the selected first time of arrival from the set of potential times of arrival if the quality metric value is below a predefined threshold to generate an adjusted set of potential times of arrival and repeating the selecting, determining a value of a quality metric, and removing additional selected first times of arrival until the quality metric value is above the predefined threshold The method may further include determining a distance between the transmitter and receiver from the adjusted set of potential times of arrival. The quality metric may include a measure of the time of arrival difference between the selected first time of arrival and an estimate of the time of arrival of the positioning signal. The measure may be based at least in part upon the location of a time domain cross-correlation peak. The method may include implementation of a Likelihood MUSIC algorithm to determine a set of early arrival peaks from the pseudospectrum. The quality metric may be based on a decision as to whether or not the correlation peak associated with the selected first time of arrival falls within a signal power versus delay mask, relative to the location and power of the strongest correlation peak. The quality metric may include a measure of the strength of a signal associated with the selected first time of arrival relative to a measure of noise. Various additional aspects, features, and functions are described below in conjunction with the appended Drawings.

EXAMPLE EMBODIMENTS

As used herein, the term "exemplary" means serving as an example, instance or illustration. Any aspect and/or embodiment described herein as "exemplary" is not necessarily to be construed as preferred or advantageous over other aspects and/or embodiments.

As used herein, the term "quality metric" refers to one or more measurements that result in a number whose value may be used in a decision making stage. The value of a quality refers to a numeric value that is computed as a function of the measurements. The value may be computed in a complex manner.

In some cases a quality metric may be based upon a "measure", as in a measure of time of arrival difference. Measure means a function, such a function of the time of arrival difference. Note that in this example, a measure may be proportional to time of arrival difference, or it may mean proportional to the reciprocal of time of arrival difference, or it may mean a more complex function of the time of arrival difference. Hence, if it is described that a measure of a quantity is compared to a threshold, it merely means that a function of the quantity is compared to a threshold.

It is noted that in the following description, numerous specific details are introduced to provide a thorough understanding of, and enabling description for, the systems and methods described. One skilled in the relevant art, however, will recognize that these embodiments can be practiced without one or more of the specific details, or with other components, systems, and the like. In other instances, well-known structures or operations are not shown, or are not described in detail, to avoid obscuring aspects of the disclosed embodiments.

In Wide Area Positioning Systems (WAPS) such as are described in, for example, co-assigned U.S. patent application Ser. No. 13/535,128, entitled WIDE AREA POSITIONING SYSTEMS AND METHODS, filed Jun. 27, 2012, the content of which is incorporated by reference herein, time of arrival of positioning signals sent from multiple transmitters are measured at a corresponding receiver to determine distances to known transmitter locations, and thereby allow position determination. A fundamental limitation on performance in these systems is often imposed by received positioning signals with multipath components (also denoted as multipath signals). Multipath signals are one or more signals present at the receiver from reflections of the originally transmitted signal, which may be amplitude attenuated and/or phase shifted relative to a corresponding direct path signal between the transmitter and receiver. These delayed signals may distort the estimated time of arrival at the receiver in applications where distance is determined based on time of arrival of the direct path signal.

A typical WAPS implementation includes multiple towers (also referred to herein as "transmitters") broadcasting synchronized positioning signals to one or more mobile receivers, such as shown in the example system of FIG. 1, with the receivers determining distances to each of the transmitters for location determination. In an exemplary embodiment, transmitters 110 are terrestrially located, but other systems may use satellite or other non-terrestrial transmitters to implement similar location determination functionality. One or more receivers 120, which may be smart phones, tablet devices, dedicated location devices, or other devices, such as combinations of phones, GPS devices, other radio receivers, and the like, may be used in a typical system. For example, emergency responders may have positioning functionality configured on a cellular phone or other mobile device with receiving and computing capability. Alternately, dedicated mobile locating devices with receiver and processing capability may be used in some applications.

Turning to FIG. 1, a block diagram of details of an example location/positioning system 100 on which various embodiments may be implemented is illustrated. Positioning system 100, also referred to herein as a Wide Area Positioning System (WAPS), or "system" for brevity, includes a network of synchronized beacons (also denoted herein as "transmitters"), which are typically terrestrial, as well as user devices (also denoted herein as "receivers" for brevity) configured to acquire and track signals provided from the beacons and/or other position signaling, such as may be provided by a satellite system such as the Global Positioning System (GPS) and/or other satellite or terrestrially based position systems. The receivers may optionally include a location computation engine to determine position/location information from signals received from the beacons and/or satellite systems, and the system 100 may further include a server system in communication with various other systems, such as the beacons, a network infrastructure, such as the Internet, cellular networks, wide or local area networks, and/or other networks. The server system may include various system-related information and components, such as an index of towers, a billing interface, one or more encryption algorithm processing modules, which may be based on one or more proprietary encryption algorithms, a location computation engine module, and/or other processing modules to facilitate position, motion, and/or location determination for users of the system. The above described transmitters need not be restricted to only transmitting information, but may also have receiving functionality, both in wired and wireless configurations. For example, the transmitters may receive synchronization information from external entities. Similarly, the above described receivers normally have transmitting functionality, both in wireless and wired configurations. In some embodiments the receivers may transmit information to the transmitters wirelessly. In the following description emphasis is placed upon the transmitting functions of the transmitters and the receiving functions of the receivers; however, either or both may be include the alternate functionality in various embodiments.

As shown in exemplary system 100, the beacons may be in the form of a plurality of transmitters 110, and the receivers may be in the form of one or more receivers (e.g. user devices) 120, which may be any of a variety of electronic communication devices configured to receive signaling from the transmitters 110, as well as optionally be configured to receive GPS or other satellite system signaling, cellular signaling, Wi-Fi signaling, Wi-Max signaling, Bluetooth, Ethernet, and/or other data or information signaling as is known or developed in the art. The receivers 120 may be in the form of a cellular or smart phone, a tablet device, a PDA, a notebook or other computer system, and/or similar or equivalent devices. In some embodiments, the receiver may be a standalone location/positioning device configured solely or primarily to receive signals from the transmitters 110 and determine location/position based at least in part on the received signals. As described herein, receivers 120 may also be denoted herein as "User Equipment" (UEs), handsets, smart phones, tablets, and/or simply as a "receiver." FIG. 2, described subsequently herein, illustrates a block diagram of details of an embodiment of a receiver architecture as may be used in various embodiments.

The transmitters 110 (which may also be denoted herein as "towers") are configured to send transmitter output signals to multiple receivers 120 (a single receiver 120 is shown in FIG. 1 for simplicity, however, a typical system will be configured to support many receivers within a defined coverage area) via communication links (e.g., signals) 113 as shown. As noted previously, the transmitted signals may result in multiple signals being received at the receivers including both direct path signals and one or more multipath signals.

The transmitters 110 may also be connected to a server system 130 via communication links 133, and/or may have other communication connections (not shown) to a network infrastructure 170, such as via wired connections such as Ethernet, USB, and the like, and/or wireless connections such as cellular data connections, Wi-Fi, Wi-Max, or other wireless connections.

One or more receivers 120 may receive signaling from multiple transmitters 110 via corresponding communication links 113 from each of the transmitters 110. Signals received via communication links 113 may include both direct path components and multipath components reflected from terrain, buildings, or other surfaces or structures.

In addition, as shown in FIG. 1, a receiver 120 may also be configured to receive and/or send other signals via communication link 163 from a cellular or other network node 160. The other signals via communication link 163 may include, for example, cellular network signals from a cellular base station (also known as a NodeB, eNB, or base station), Wi-Fi network signals, Pager network signals, or other wired or wireless connection signaling, as well as satellite signaling via satellite communication links 153, such as from a GPS or other satellite positioning system. While the satellite positioning signaling shown in the exemplary embodiment of FIG. 1 is shown as being provided from GPS system satellites 150, in other embodiments the signaling may be provided from other satellite systems and/or, in some embodiments, terrestrial-based wired or wireless positioning systems or other data communication systems or positioning systems.

In an exemplary embodiment, the transmitters 110 of the system 100 are configured to operate in an exclusively licensed or shared licensed/unlicensed radio spectrum; however, some embodiments may be implemented to provide signaling in unlicensed shared spectrum. The transmitters 110 may transmit signaling in these various radio bands using novel signaling as is described in co-assigned applications, such as in U.S. patent application Ser. No. 13/535,128, which is incorporated by reference herein. This signaling may be in the form of a proprietary signal configured to provide specific data in a defined format advantageous for location and navigation purposes. For example, the signaling may be structured to be particularly advantageous for operation in obstructed environments, such as where traditional satellite position signaling is attenuated and/or impacted by reflections, multipath, and the like. In addition, the signaling may be configured to provide fast acquisition and position determination times to allow for quick location determination upon device power-on or location activation, reduced power consumption, and/or to provide other advantages.

Various embodiments of WAPS may be combined with other positioning systems to provide enhanced location and position determination. Alternately, or in addition, a WAPS system may be used to aid other positioning systems. In addition, information determined by receivers 120 of WAPS systems may be provided via other communication network links 163, such as cellular, Wi-Fi, Pager, and the like, to report position and location information to a server system or systems 130, as well as to other networked systems existing on or coupled to network infrastructure 170. For example, in a cellular network, a cellular backhaul link 165 may be used to provide information from receivers 120 to associated cellular carriers and/or others (not shown) via network infrastructure 170. This may be used to quickly and accurately locate the position of receiver 120 during an emergency, or may be used to provide location-based services or other functions from cellular carriers or other network users or systems.

It is noted that, in the context of this disclosure, a positioning system is one that localizes one or more of latitude, longitude, and altitude coordinates, which may also be described or illustrated in terms of one, two, or three dimensional coordinate systems (e.g., x, y, z coordinates, angular coordinates, etc.). The positioning system may also provide time of day information to the various receivers. It is noted that whenever the term 'GPS' is referred to, it is done so in the broader sense of Global Navigation Satellite Systems (GNSS) which may include other existing satellite positioning systems such as GLONASS as well as future positioning systems such as Galileo and Compass/Beidou. In addition, as noted previously, in some embodiments other positioning systems, such as terrestrially based systems, may be used in addition to or in place of satellite-based positioning systems.

Embodiments of WAPS include multiple towers or transmitters, such as multiple transmitters 110 as shown in FIG. 1, which broadcast WAPS data positioning information, and/or other data or information, in transmitter output signals to the receivers 120. The positioning signals may be coordinated so as to be synchronized across all transmitters of a particular system or regional coverage area. Transmitters may use a disciplined GPS clock source for timing synchronization. WAPS data positioning transmissions may include dedicated communication channel methodologies (e.g., time, code and/or frequency modulation and multiplexing methods) to facilitate transmission of data required for trilateration, notification to subscriber/group of subscribers, broadcast of messages, general operation of the WAPS network, and/or for other purposed such as are described subsequently herein and/or in the following co-assigned patent applications which are incorporated by reference herein: U.S. Utility patent application Ser. No. 13/412,487, entitled WIDE AREA POSITIONING SYSTEMS, filed on Mar. 5, 2012; U.S. Utility patent Ser. No. 12/557,479 (now U.S. Pat. No. 8,130,141), entitled WIDE AREA POSITIONING SYSTEM, filed Sep. 10, 2009; U.S. Utility patent application Ser. No. 13/412,508, entitled WIDE AREA POSITIONING SYSTEM, filed Mar. 5, 2012; U.S. Utility patent application Ser. No. 13/296,067, entitled WIDE AREA POSITIONING SYSTEMS, filed Nov. 14, 2011; U.S. Provisional Patent Application Ser. No. 61/163,020, entitled WIDE AREA POSITIONING SYSTEM, filed Mar. 24, 2009; U.S. Provisional Patent Application Ser. No. 61/095,856, entitled WIDE AREA POSITIONING SYSTEM, filed Sep. 10, 2008; U.S. Provisional Patent Application Ser. No. 61/502,272, entitled DATA TRANSMISSION METHODS IN WIDE AREA POSITIONING SYSTEMS (WAPS), filed Jun. 28, 2011; U.S. Provisional Patent Application Ser. No. 61/502,276, entitled CODING IN WIDE AREA POSITIONING SYSTEMS, filed Jun. 28, 2011; and U.S. Provisional Patent Application Ser. No. 61/514,369, entitled CELL ORGANIZATION AND TRANSMISSION SCHEMES IN A WIDE AREA POSITIONING SYSTEM (WAPS), filed Aug. 2, 2011. These application may also be denoted collectively herein as the "incorporated applications." The various aspect, details, devices, systems, and methods disclosed herein may be combined with the teachings of the incorporated applications in WAPS or other similar systems in various embodiments.

In a positioning system that uses time difference of arrival for trilateration, the positioning information typically transmitted includes one or more of precision timing sequences and positioning data, where the positioning data includes the location of transmitters and various timing corrections and other related data or information. Here, trilateration refers to determining the location of a receiver using multiple distance measurements. In one WAPS embodiment, the data may include additional messages or information such as notification/access control messages for a group of subscribers, general broadcast messages, and/or other data or information related to system operation, users, interfaces with other networks, and other system functions. The positioning data may be provided in a number of ways. For example, the positioning data may be modulated onto a coded timing sequence, added or overlaid over the timing sequence, and/or concatenated with the timing sequence.

Data transmission methods and apparatus described herein may be used to provide improved location information throughput for the WAPS. In particular, higher order modulation data may be transmitted as a separate portion of information from pseudo-noise (PN) timing, or ranging, data. This may be used to allow improved acquisition speed in systems employing CDMA multiplexing, TDMA multiplexing, or a combination of CDMA/TDMA multiplexing. The disclosure herein is illustrated in terms of wide area positioning systems in which multiple towers broadcast synchronized positioning signals to mobile receivers and, more particularly, using towers that are terrestrial; however, the embodiments are not so limited and other systems within the spirit and scope of the disclosure may also be implemented.

In an exemplary embodiment, a WAPS uses coded modulation sent from a tower or transmitter, such as transmitter 110, called spread spectrum modulation or pseudo-noise (PN) modulation, to achieve wide bandwidth. The corresponding receiver 120, includes one or more modules to receive the transmitted signals and process the received signals using a despreading circuit, such as a matched filter or a series of correlators, for example. Such a receiver produces a waveform which, ideally, has a strong peak surrounded by lower level energy. The time of arrival of the peak represents the time of arrival of the transmitted signal at the mobile receiver. Performing this operation on a multiplicity of signals from a multiplicity of towers, whose locations are accurately known, allows determination of the receiver's location via trilateration. Various additional details related to WAPS signal generation in a transmitter, such as transmitter 110, along with received signal processing in a receiver, such as receiver 120, are described subsequently herein.

In one embodiment, a WAPS may use binary coded modulation as the spreading method. The WAPS signals of an exemplary embodiment may include two specific types of information: (1) a high speed ranging signal, and (2) location data such as transmitter ID and position, time of day, health, environmental conditions such as pressure data, etc. WAPS may, similarly to GPS, transmit location information by modulating a high speed binary pseudorandom ranging signal with a lower rate information source. In addition to this application, the disclosures of the incorporated applications describe embodiments of methods and devices that use a pseudorandom ranging signal and a modulating information signal, both of which may utilize higher order modulations, such as quaternary or octonary modulation. These disclosures may be combined with the descriptions herein in various alternate embodiments. In one embodiment, the ranging signal is binary phase modulated, and location information is provided in a separate signal using higher order modulation.

Conventional systems use a format of a position location signal (e.g., used in a Time Division Multiplexing arrangement) in which each slot transmission comprises a pseudorandom ranging signal followed by various types of location data. These conventional systems also include a synchronization, or sync, signal, which may be deleted if the pseudorandom ranging signal is used also as the sync signal. However, as with other earlier systems, the location data of these conventional systems is binary, which limits throughput. These systems also transmit a large number of binary bits during the interval in which the location data is transmitted.

To address these limitations, in exemplary embodiments, a binary, or quaternary, pseudorandom signal may be transmitted in a particular slot followed by a higher order modulated data signal. For example, in a given slot one or more location information symbols may be transmitted using differential 16-phase modulation, in order to transmit four bits of information per slot. This represents a four-fold throughput improvement versus the one bit typically transmitted when binary phase modulation is imposed upon the pseudorandom carrier. Other types of modulation of location information may also be utilized, such as 16 QAM, etc. In addition, certain error control modulation methods may be used for the higher level modulation, such as the use of Trellis codes. These modulation methods generally reduce error rates.

As noted previously, a significant problem that occurs in terrestrial location systems, especially ones that operate in urban environments with densely placed buildings and other reflective structures, is the presence of multipath signals due to reflections. In these environments, a mobile receiver, such as a cellular phone 120 or other received device, may receive multiple delayed "copies" (also referred to herein as multipath components) of a single transmitted signal, such as signal received over a communication link 113 from one of the transmitters 110 of FIG. 1, with the multiple signals corresponding to a multiplicity of reflected paths as well as (in many cases) a direct path signal component between each transmitter and the receiver. The delayed signals may be due to reflective surfaces in the operating environment such as buildings or other structures, terrain, and the like. These delayed signals may also be attenuated and/or phase shifted, relative to a direct line of sight signal, if one exists. While signal configuration and signaling techniques may be implemented to mitigate these effects, such as described in, for example, co-assigned U.S. patent application Ser. No. 13/535,128, other methods, such as the eigenvalue-based and other methods described subsequently herein, may be used to further mitigate multipath problems.

The range of delays of the multipath signal components, sometimes called the delay spread, is typically constrained by geometric constraints of the environment. For example, a delay spread of 1 microsecond corresponds to a maximum differential path length of approximately 300 meters, and a delay spread of 5 microseconds to approximately 1500 meters. Knowledge of the maximum likely delay spread is useful in determining a time range over which a receiver may examine the paths, and may allow discarding of spurious signals. Maximum delay spread is a function of the environment and parameters such as the spacing of buildings and other structures, terrain, and other characteristics such as attenuating surfaces and the like.

Figure 3A:
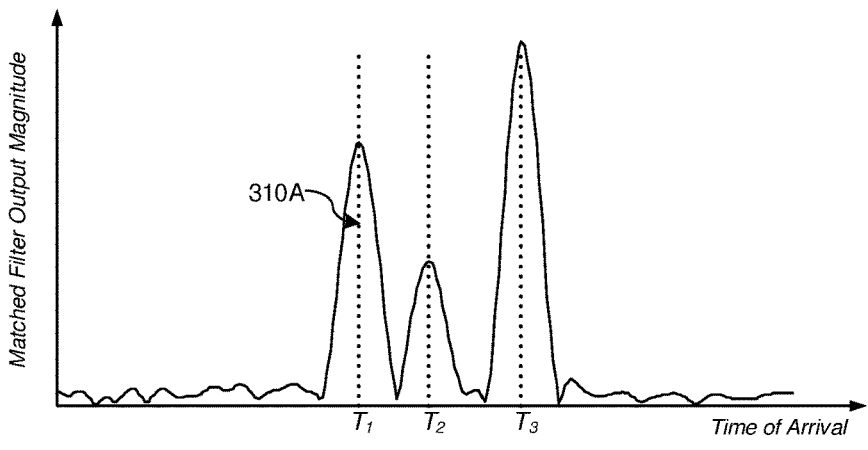
FIG. 3A, FIG. 3B, and FIG. 3C illustrate example output signals from an embodiment of a despreading module showing example multipath signal peaks.

Typical WAPS, such as those described in co-assigned U.S. patent application Ser. No. 13/535,128, use coded modulation, such as spread spectrum modulation, or pseudonoise (PN) modulation, to achieve wide bandwidth. As previously noted, transmitters, such as the transmitters 110 of FIG. 1, send such coded or PN signals, which may then be received at corresponding mobile receivers, such as receiver 120. The mobile receiver then processes the coded signals with a despreading device, typically a matched filter or a series of correlators. Such a receiver produces an output signal waveform which ideally (in the absence of any reflected signals) has a strong peak surrounded by lower level energy, such as example output signal 310A as shown in FIG. 3A. The time of arrival of the peak ($T_1$) corresponds with the time of arrival of the transmitted signal at the mobile device.

Performing operation on a multiplicity of signals from a multiplicity of towers, whose locations are accurately known, allows determination of the mobile's location via trilateration algorithms. For example, in the WAPS of FIG. 1, three or more transmitters 110 may send uniquely encoded signals to the receiver 120, which may then estimate the distance to each tower and triangulate a position from the estimated distances. However, distance estimation errors due to multipath may introduce errors, and in some cases, such as described subsequently herein, may cause catastrophic errors in location determination. This can be extremely problematic in applications such as first-response during emergencies and the like.

Figure 3B:
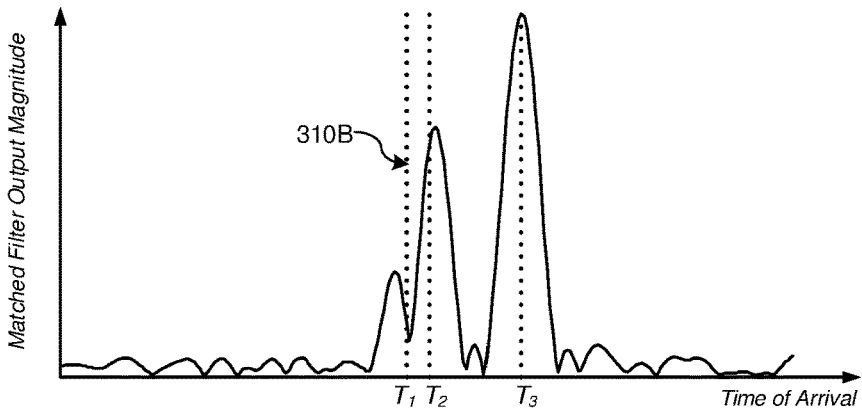
Figure 3C:
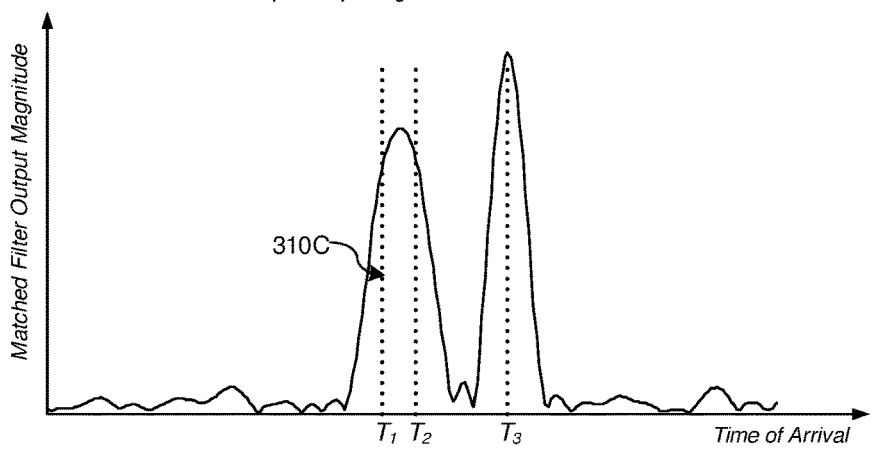

It should be noted that although the wideband pseudonoise modulation often takes the form of a high rate binary or quaternary phase shift keyed signal, no such limitation is imposed upon the aspects disclosed herein, and the same or similar concepts may be implemented in other systems. For example, other wideband coding methods such as chirp modulation, orthogonal frequency division multiplexing (OFDM), high rate frequency hopping, etc., may benefit from the processing methods and systems described herein. What is typically common is that a despreading module or equivalent hardware and/or software module are utilized at a receiver to produce a waveform having a strong peak (corresponding to the direct path signal), which may be utilized to measure time of arrival, along with possible weaker peaks that correspond to the multipath signals. In some cases, the direct path signal may be weaker than the other signals, and the receiver preferentially still identifies the direct path signal. Furthermore, the direct and multipath signals may overlap each other significantly as a function of time and the receiver attempts to distinguish these signals from one another and identify the direct path, if possible, such as shown in the example of FIG. 3C. It is further noted that the signal processing methods and systems provided herein also may be applied to non-spread spectrum signals, such as other signals that are pulse like in nature or can be processed at a receiver to provide an output peak corresponding to a signal arrival time.

Figure 2:
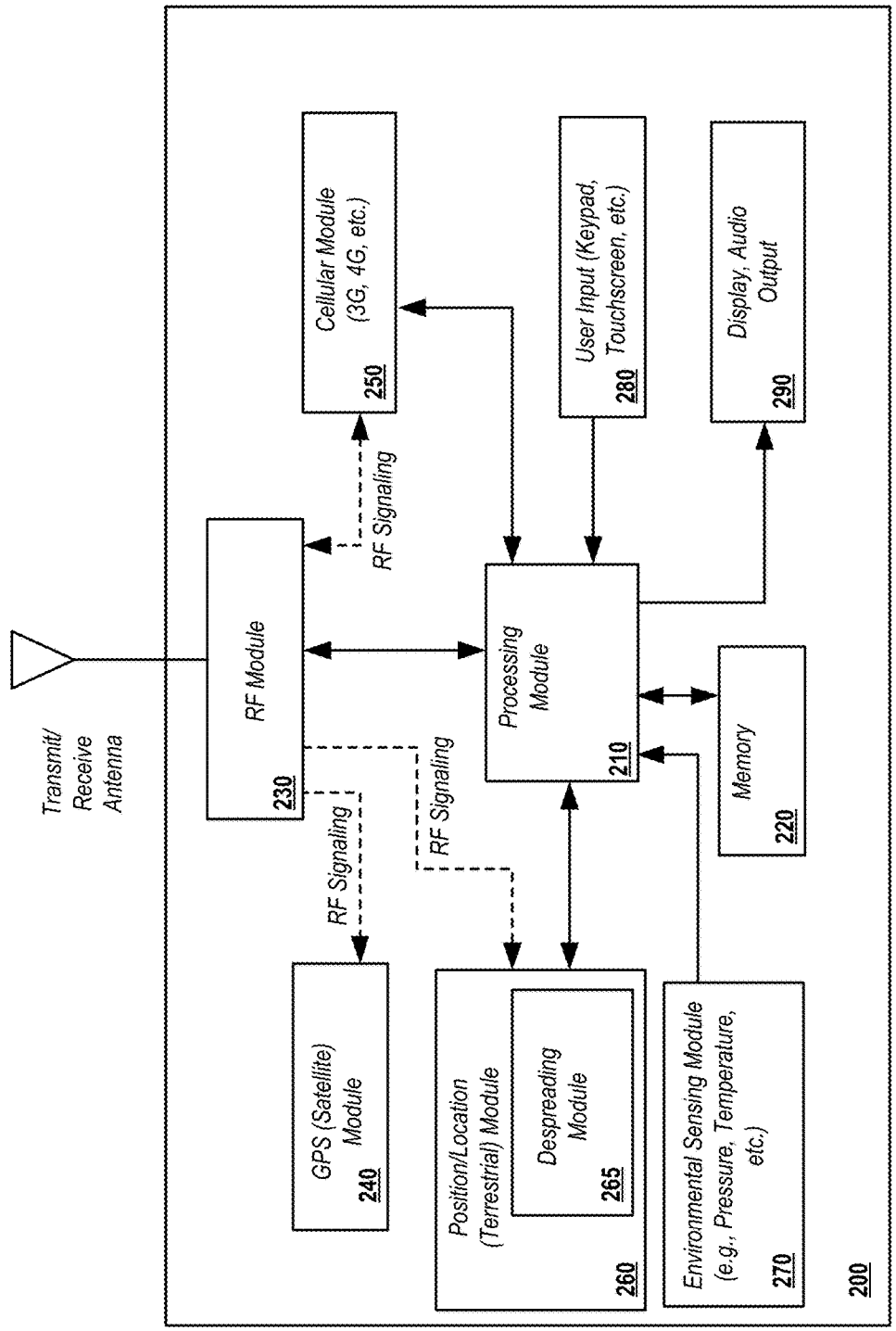
FIG. 2 illustrates details of an embodiment of a receiver/user device in accordance with certain aspects.

Turning to FIG. 2, an example embodiment of details of a receiver embodiment 200 is illustrated. Receiver embodiment 200 may be part of a receiver 120 such as a smart phone, tablet, or other device which transmitted positioning signals may be received and processed to determine location/position information in one or more processing elements. Receiver embodiment 200 may correspond with the receiver 120 as shown in FIG. 1.

Receiver embodiment 200 may include one or more GPS modules 240 for receiving GPS signals and determining location information and/or other data, such as timing data, dilution of precision (DOP) data, or other data or information as may be provided from a GPS or other positioning system, and providing the determined information to processing module 210 and/or other modules of the receiver. It is noted that while receiver embodiment 200 is shown in FIG. 2 with a GPS module, other modules for receiving satellite or terrestrial signals and providing similar or equivalent output signals, data, or other information may alternately be used in various embodiments.

Receiver embodiment 200 may also include one or more cellular modules 250 for sending and receiving data or information via a cellular or other data communications system. Alternately, or in addition, receiver embodiment 200 may include communications modules (not shown) for sending and/or receiving data via other wired or wireless communications networks, such as Wi-Fi, Wi-Max, Bluetooth, USB, Ethernet, or other data communication networks.

Receiver embodiment 200 may include one or more position/location modules for receiving signals from terrestrial transmitters, such as transmitters 110 as shown in FIG. 1, and processing the signals to determine position/location information as described subsequently herein, including for performing multipath signal processing as described subsequently with respect to FIGS. 7-13. Position module 260 may be integrated with and/or may share resources such as antennas, RF circuitry, and the like with other modules, such as, for example, GPS module 240. For example, position module 260 and GPS module 240 may share some or all radio front end (RFE) components and/or processing elements. Processing module 210 may be integrated with and/or share resources with position module 260 and/or GPS module 240 to determine position/location information and/or perform other processing functions as described herein. Similarly, cellular module 250 may share RF and/or processing functionality with RF module 230 and/or processing module 210. A despreading module 265 may be incorporated in position module 260 and/or processing module 210 in various embodiments, or may be a separate module or part of the RF receiver module 230.

One or more memories 220 may be coupled with processing module 210 to provide storage and retrieval of data and/or to provide storage and retrieval of instructions for execution in the processing module 210. For example, the instructions may be for performing the various processing methods and functions described subsequently herein, such as for performing multipath signal processing, determining location information or other information based on received transmitter, GPS, cellular, pressure, temperature, and/or other signals or data, or for implementing other processing functions.

Receiver embodiment 200 may further include one or more environmental sensing modules 270 for sensing or determining conditions associated with the receiver, such as, for example, local pressure, temperature, or other conditions. In an exemplary embodiment, pressure information may be generated in environmental sensing module 270 and provided to processing module 210 for use in determining location/position information in conjunction with received transmitter, GPS, cellular, or other signals.

Receiver embodiment 200 may further include various additional user interface modules, such as a user input module 280, which may be in the form of a keypad, touchscreen display, mouse, or other user interface element. Audio and/or video data or information may be provided on an output module 290, such as in the form of one or more speakers or other audio transducers, one or more visual displays, such as LCD displays, touchscreens, and/or other user I/O elements as are known or developed in the art. In an exemplary embodiment, output module 290 may be used to visually display determined location/position information based on received transmitter signals. The determined location/position information may also be sent to cellular module 250 to an associated carrier or other entity.

In a typical positioning system receiver, such as receiver embodiment 200 of FIG. 2, a matched filter is used to process a received spread spectrum signal. The matched filter may be implemented in a processing element, such as processing module 210, or in other receiver modules such as position module 260, or other modules, such as despreading module 265. Matched filter implementation methods and signal processing hardware are well known in the art. Assuming use of a matched filter to process a received spread spectrum signal, when multipath is present, the matched filter output produces a series of (possibly) overlapping sharp pulses of varying amplitudes, delays and phases. FIGS. 3A, 3B and 3C show example magnitude outputs from such a matched filter. The dotted lines show the true times of arrival of three returns. Note that in FIGS. 3B and 3C the peak locations of the matched filter magnitudes are not coincident with the true times of arrival. In practice both the magnitude and phase (or inphase and quadrature components) from the matched filter are available from which to determine times of arrival. The mobile receiver attempts to estimate the time of arrival of the earliest such pulse from the matched filter. A variety of algorithms may be used for this purpose, such as leading edge location algorithms, MUSIC algorithm, minimum mean square estimation algorithms, etc. Embodiments of the various aspects disclosed herein may be used to improve performance of such receivers.

FIGS. 3A and 3B show the magnitudes of pulses exiting the matched filter that are clearly discernible from one another. In FIG. 3B, the location of the first two peaks are not coincident with the true times of arrival of the individual returns, as indicated by the dotted lines. Furthermore, in practice, several of these pulses may heavily overlap one another, so that such overlapping pulses are not easily distinguishable from one another by a simple peak finding algorithm. An example of overlapping pulses is illustrated in FIG. 3C, where it is seen that the first two pulses actually merge together to form a single pulse (the dotted lines show the true times of arrival). In such cases, more powerful methods, such as the aforementioned MUSIC algorithm, may be employed to better separate out such overlapping pulses and measure their individual times of arrival. Exemplary embodiments of the methods and apparatus described herein are focused upon the cases of pulses that are heavily overlapped with one another.

In a typical WAPS embodiment such as shown in FIG. 1, a remote receiver processes positioning signals received from a multiplicity of broadcast stations, and then utilizes time of arrival (TOA) based trilateration methods to determine the position of the receiver. One may refer to this as a forward TOA positioning method. A number of other time-of-arrival based approaches also exist and benefit from the signal processing algorithms and methods described herein.

In one such embodiment, which may be termed an inverse positioning system, a transmission from the entity to be positioned is received by a multiplicity of stations. The times of reception at these stations may then be used to compute the position of the entity. Clearly such a system should incorporate communication links in order to compare these times of arrival. In other embodiments the round trip time of arrival may be measured between a receiver and a multiplicity of stations. For example, each station may broadcast a positioning signal, which is in turn received by a transceiver (to be located) and then after a fixed, or measured delay, such a transceiver transmits back to the station another positioning signal. The transmitted and received times at the station produce a time difference which is utilized to compute the position of the transceiver.

A similar such system is one in which the transceiver initiates the round trip procedure and the time difference is hence measured at the transceiver. All such embodiments based upon time-of-arrival measurements may benefit from the invention herein; however, for clarity only the forward TOA positioning method is discussed in the following. It will be apparent to one of ordinary skill at the art that similar implementations may also be used in various other systems.

As indicated above, in some embodiments, the direct path signal component and one or more delayed signal components (if present) should be separated for determining the earlier arrival time for distance estimation. A number of methods have been developed in the art to separate these multiple delayed signals from each other at the receiver. These are sometimes termed "superresolution" algorithms Many of these methods depend upon an eigenvalue decomposition of an estimated covariance matrix constructed from received sampled data. One aspect of this disclosure is directed to various embodiments of methods for processing received signals to separate the eigenvalues of such a decomposition into those associated with additive noise and those associated with the positioning signals. In addition, embodiments may include improved methods for processing received signals to discard spurious estimates of the time of arrival of the earliest signal. The resulting processed information may provide improvement in determining the time of arrival of the earliest received positioning signal, which may be used to improve overall positioning accuracy.

As used herein, "sample covariance" relates to the following concept. The received signal is processed in some manner to provide a sample vector, say, X, where X is a column vector of dimension M. The processor then wishes to determine the expected value of XX', which is termed the covariance herein, where the prime denotes the Hermitian conjugate. In the following, when describing covariance, this generally refers to estimated covariance, rather than the actual true covariance, and it should be clear in the context where this is the case. A variety of algorithms may be used to estimate this quantity, as discussed subsequently herein.

It is important to note that the desire to determine the earliest path is not necessarily important in applications other than position location, where time of arrival of the direct path is very important. In other applications, such as antenna beam-forming problems and communication signal processing, such a first path may have no particular importance versus other paths, and receivers may operate to combine the multiple signals to increase received signal energy (rather than to determine a specific arrival time of the direct path signal).

As discussed herein, processing errors in determining first path time of arrival may give rise to potentially catastrophic positioning errors, a characteristic which may not be important in other applications. For example, in the examples shown in FIG. 3A, 3B, or 3C, there are noise peaks prior to any of the signal peaks. If such peaks are misinterpreted as signal peaks, catastrophic errors may occur. Similarly, if the location of the first (presumably direct) peak is missed, or greatly in error, as seen to be possible in the examples of FIG. 3B or 3C, then large errors in time of arrival may also occur.

An early example of the superresolution approach for multipath signal separation is termed the MUSIC (Multiple Signal Characterization) algorithm (e.g., see, A. Bruckstein, T. Shan and T Kailath, "The Resolution of Overlapping Echoes," *IEEE Trans. Acoustics, Speech and Signal Processing*, Vol. ASSP-33, No. 6, pp. 1357-1367, December 1985), but a large number of related such algorithms (for example, ESPRIT, Root-MUSIC, EVMUSIC, etc.) have been developed in recent years, all utilizing some form of eigenvalue decomposition, associated with a (estimated) covariance matrix.

In many cases the data being processed consists of a set of (sampled) signals plus additive independent noise. In these cases, the covariance of such data consists of a covariance associated with the signal plus a covariance associated with the noise. Then the overall eigenspace can be separated into orthogonal subspaces associated with the signal and noise. Typically, the noise samples are Gaussian and white and hence the (ideal) eigenvalues associated with the noise subspace are equal and small in value. The eigenvalues associated with the signal subspace are typically much larger in value, especially if the signal-to-noise ratio, after the despreader, is large.

These properties may be used as a basis of determining parameters, including times-of-arrival, of the overlapping received signals. As noted previously, in these algorithms the eigenvectors associated with the noise are orthogonal to the signal subspace. Consequently, the noise eigenvectors are orthogonal to a functional of the transmitted signal, sometimes called the "array manifold."

Considered in the time domain, this functional is simply the set of transmitted signal samples parameterized by delay. Alternately, in some implementations the processing is performed in the frequency domain by performing a discrete Fourier transform of the data. In this case, the array manifold takes the form of a weighted complex sinusoid with the parameter being frequency, which is directly related to the delay, or time of arrival. In either case, the orthogonality of the noise eigenvectors to the array manifold, when the correct parameters are chosen, may be used to determine these parameters, which are easily related to the times of arrival of the various signals.

Figure 14A:
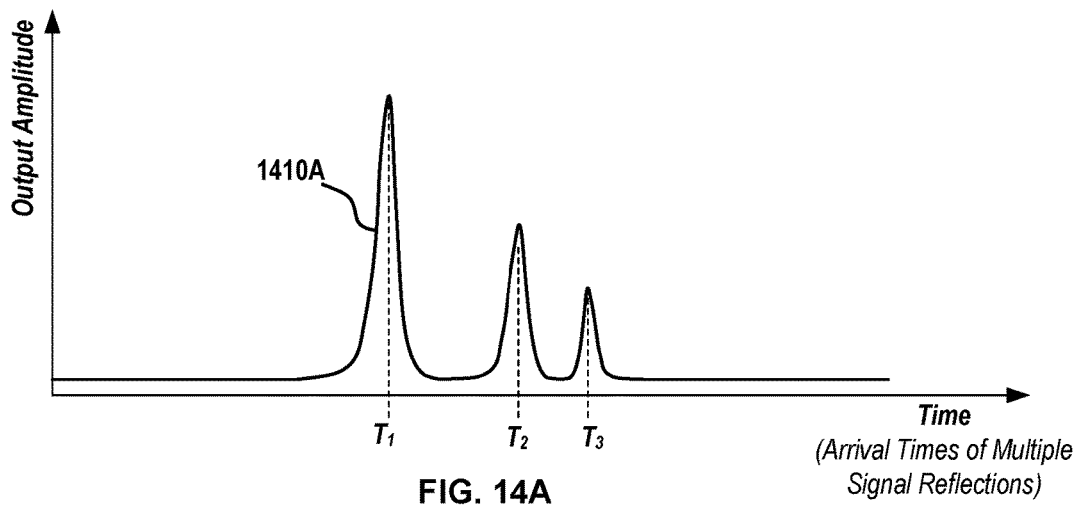
FIG. 14A and FIG. 14B illustrate example super-resolution output signals from an embodiment of a despreading module.
Figure 14B:
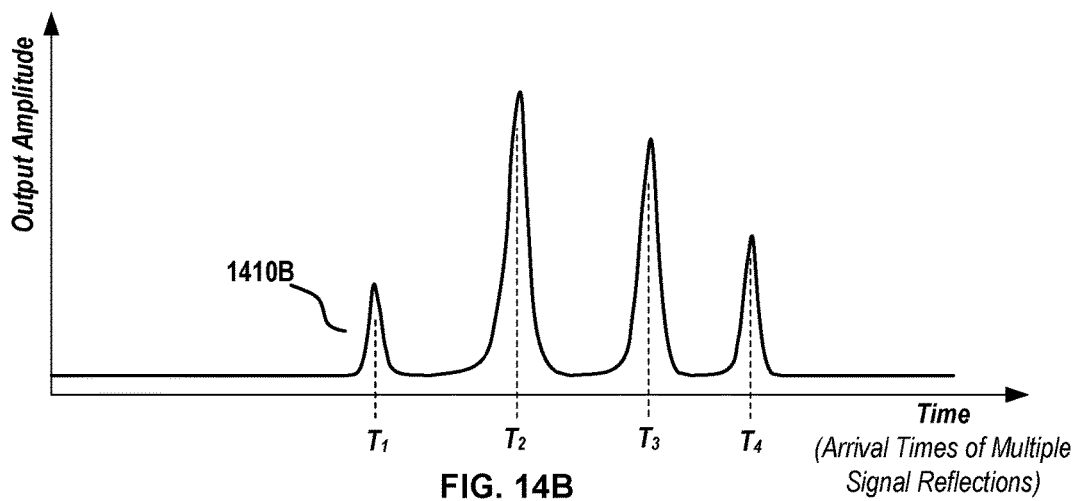

In effect, this orthogonality property allows for a calculation of a pseudospectrum which has peaks at locations related to the times of arrival of the various received signals (e.g., corresponding to the output signal peaks as shown in FIGS. 3A, 3B, and 3C). A variety of algorithms have been devised (MUSIC, Root-MUSIC, EV-MUSIC, etc.) to produce such a pseudospectrum. FIGS. 14A and 14B provide examples of pseudospectrum amplitude versus delay. FIG. 14A shows the case in which the first path (1410A) has a larger output amplitude than the other paths and FIG. 14B shows the situation in which the first path (1410B) is smaller. Note that the peaks provided by the pseudospectra may be distinct even if the corresponding peaks in the matched filter output heavily overlap and are not distinguishable (as in FIG. 3C). Furthermore, the peaks in the pseudospectra often eliminate large time biases that may be present in the peak locations from the matched filter (see FIG. 3B, for example).

It is noted that if there are M total independent data samples used to compute the covariance and there are D received overlapping signals ("echoes"), then the noise subspace has dimensionality M-D and the signal subspace dimension D. The required full rank nature of the signal subspace is sometimes a concern in the application of these algorithms. However, various methods have been derived in constructing the covariance to ensure that this subspace is full rank. In the case of the noise being white, there would be M-D eigenvalues of the noise, having similar small values, and D larger signal eigenvalues. Since the number of echoes D is unknown a priori, it is necessary to estimate this number in some fashion, or equivalently the number of noise eigenvalues M-D. This may be done in the processing module 210 and/or position module 260 of FIG. 2, or in other processing elements of the receiver.

A number of algorithms are known in the art to estimate the size of the noise subspace, or equivalently the signal subspace. These include the minimum description length (MDL) and Akaike information criteria. The basis of such algorithms is the use of information theoretic criteria and maximum likelihood or maximum a posteriori estimates to choose the best signal model matching observations. Typically, it is assumed that observations are Gaussian distributed and that the noise eigenvalues are fairly similar in value. However, these assumptions do not hold well under a variety of circumstances. In particular, in a typical WAPS a single snapshot of data is typically used to perform the signal separation, rather than an ensemble of snapshots. This typically renders the Gaussian assumption incorrect.

Another issue is that existing algorithms attempt to find the best estimate of the noise subspace dimension M-D. The assumption here implicitly is that errors in having the estimate too high or too low have a similar penalty. In many applications (such as antenna direction of arrival applications) this is a good assumption and the resulting distribution of errors provides good system performance. However, in other applications, such as in WAPS, certain error types may result in more catastrophic errors than others. In particular, in WAPS one is interested in finding the parameters of the earliest of the multiplicity of received signal paths (e.g., the true time of arrival associated with earliest path as indicated by $T_1$ in FIG. 3A, FIG. 3B, and FIG. 3C). Furthermore, the power of such an early path may be weak, such as shown in FIG. 3B and FIG. 3C, and hence the signal eigenvalue associated with this path may be relatively low. Moreover, it is also possible for an algorithm to erroneously produce a signal eigenvector (and associated eigenvalue) from noise, and this error may result in a time of arrival estimate earlier than the direct path time of arrival. This may be due to noise peaks being present prior to the first signal peak, as indicated in FIGS. 3A, 3B and 3C. Certain errors in subspace dimension estimation can produce catastrophic results, in this regard, as described below.

The potential for catastrophic errors is easy to understand if the signal subspace dimension estimation processing is considered. In estimating the size of the signal subspace, if the dimension is chosen to be too low a Type 1 error, or a "miss" will result. If the dimension is chosen too high a Type 2 error, or "false alarm" results. If a false alarm occurs, then at least one of the noise eigenvalues, and associated eigenvectors, is considered a signal eigenvalue and eigenvector. This may give rise to identification of a false peak in the pseudospectrum since the procedure may be looking for more true signal peaks than are present. Depending upon the location of this false peak, the result may be an estimate of the time of arrival of this false signal well before that of the earliest true signal. This may in turn give rise to a catastrophically bad earliest time of arrival estimate. This error may be especially troublesome for critical applications such as emergency response, where very accurate position location is critical, and any distance errors will provide inaccurate position results. On the other hand, a Type 1 error typically means that a weak early peak may sometimes be missed (e.g., corresponding with a weak first arriving signal as shown in FIG. 3B), but this often results in a relatively small positioning error, since other valid peaks still exist and are typically close together.

Simulations by assignee NextNav have shown that catastrophically bad earliest time of arrival estimates do occur using the conventional estimation methods. However, embodiments in accordance with the various aspects disclosed herein may be used to reduce or eliminate the above-described errors, including reducing the risk of catastrophic errors.

There are two typical methods for estimating the covariance. In the first method, it is assumed that a series of snapshots, each consisting of M samples of data, are taken. If $X_n$ denotes the nth snapshot, then the covariance is estimated as the average of $X_n X_n'$, over all n, where $X_n$ is assumed to be a column vector and prime means complex (Hermitian) transpose. Here it is assumed that the snapshots are all identically distributed. For these conditions, when the noise is additive and white, it is known that as the number of snapshots averaged (N) gets large, the distribution of the eigenvalues of the noise subspace tend to cluster around a value equal to the noise variance. In this case information theoretic methods for determining the subspace (noise or signal) dimensions work well.

Figure 4:
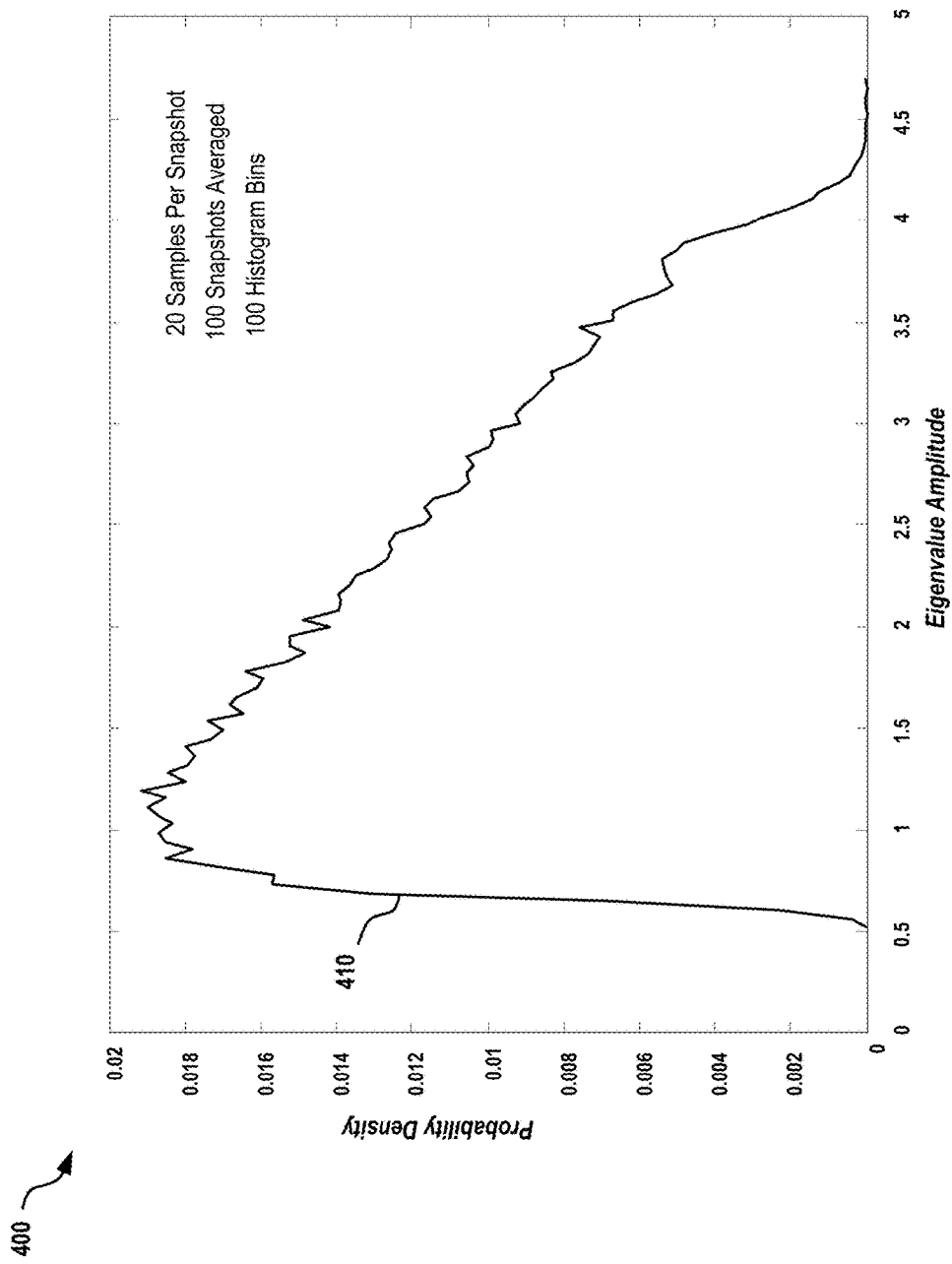
FIG. 4 illustrates details of Eigenvalue probability density statistics in one embodiment of a receiver/user device in accordance with certain aspects.

FIG. 4 shows a chart 400 of an (estimated) probability density 410 of the eigenvalues for the case in which the snapshots consisted of 20 samples of complex white Gaussian noise of variance 1 (inphase and quadrature components with variance 1). The covariances of 100 successive snapshots were averaged and the eigenvalues were found. This was repeated 10,000 times in order to accumulate enough data (200,000 values) to construct a histogram with 100 bins. The histogram was normalized to provide the probability density as shown in FIG. 4, and exhibits the clustering centered on an eigenvalue amplitude of 2, which is the mean of the distribution. It may be noted that the maximum eigenvalue was seen to be only about twice the mean for this case.

A second method for estimating the covariance, typically used in WAPS applications, utilizes a single snapshot of data and performs averaging using overlapping segments of such data. These are termed "smoothing methods" or "modified smoothing methods" depending upon the segment selection method. Such methods work only when the single snapshot can be modeled as stationary. For time of arrival estimation, converting a time snapshot into a "frequency domain snapshot" by utilizing a discrete Fourier transform (as indicated previously) can allow the construction of a data sequence that is approximately stationary. Hence, this smoothing method may be used to estimate the covariance. In this case, however, the distribution of the eigenvalues tends not to be clustered, but instead is often well modeled somewhat as an exponential distribution.

Figure 5:
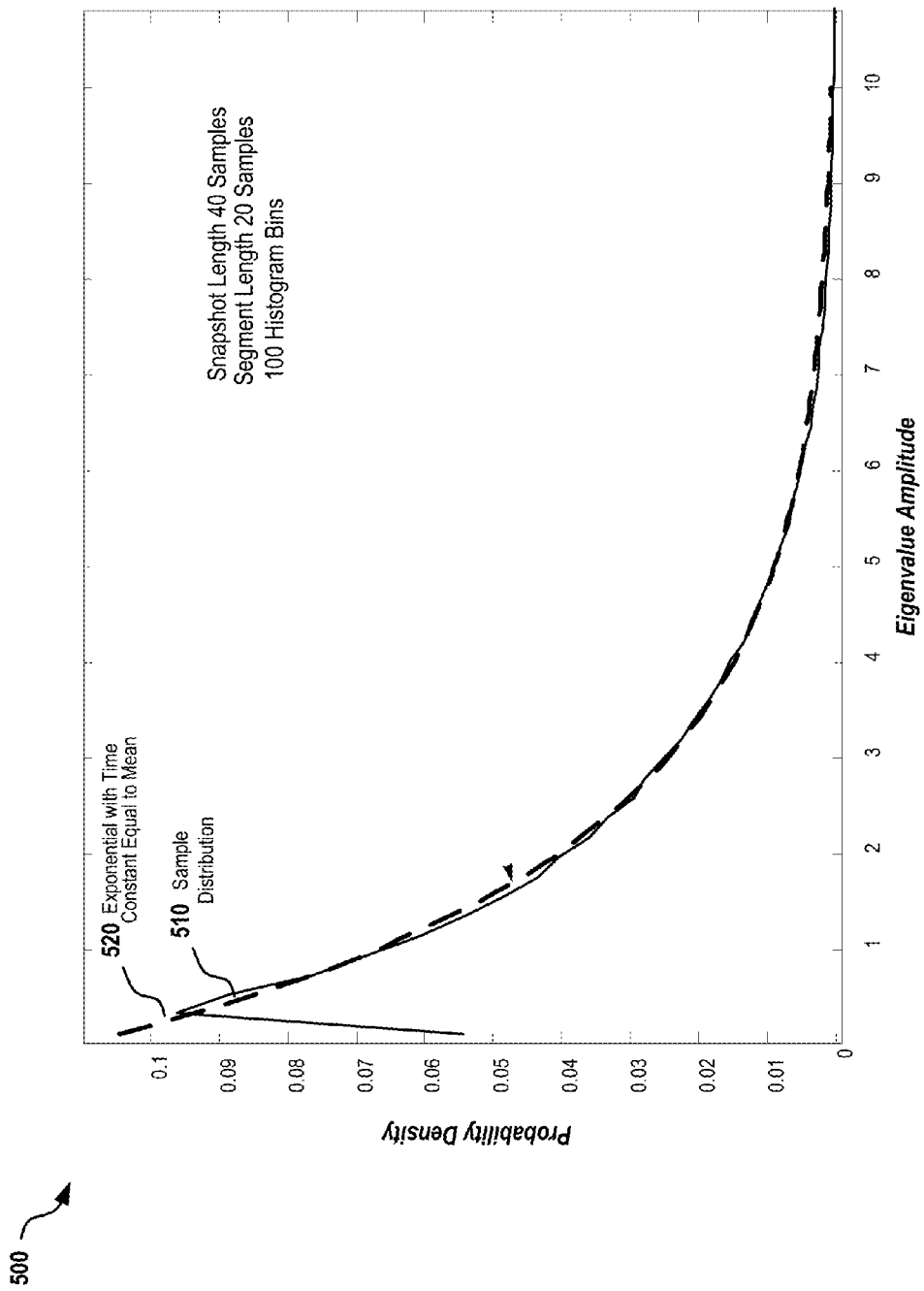
FIG. 5 illustrates details of Eigenvalue probability density statistics in an embodiment of a receiver/user device in accordance with certain aspects.

The problem with this approach is that the eigenvalues are no longer clustered about a single value but instead follow a statistical distribution which has very long tails. The result is that there may be a non-negligible probability that an individual noise eigenvalue of the estimated covariance may be very large compared to a mean, thus resulting in a false alarm, which in turn may lead to catastrophic results. FIG. 5 illustrates a graph 500 showing a statistical distribution of eigenvalues for the smoothed estimation case in which the snapshots consisted of 40 samples of complex white Gaussian noise of variance 1 (inphase and quadrature components with variance 1). For each snapshot, the covariance was estimated using overlapped segment lengths of size 20 samples and the forward-backward estimation procedure was used. The resulting eigenvalues (size 20) were then saved and this procedure was repeated 10,000 times to gather data to construct a histogram with 100 bins. The estimated mean of the distribution was approximately 2 (consistent with the input data) and overlaid on the plot is an exponential of the form $k \exp(-x/2)$. For a true exponential distribution, $k$ should be $\frac{1}{2}$. However, for this case, best match was for $k$ approximately 0.11, the difference presumably due to the curves differing at values less than 0.4. In any case the figure illustrates that the tails of the distribution are much larger than those of FIG. 4. For example there is a 1% probability that the maximum eigenvalue will be four times the mean, a fact that differs greatly from FIG. 4. As indicated previously this may lead to a catastrophic error due to production of a false early peak in the pseudospectrum (e.g., a resultant noise eigenvalue may be selected to be signal and may correspond with an arrival time much earlier than the direct path arrival time). We have also found that in many practical situations the distribution of eigenvalues follows even more closely an exponential distribution, than that shown in FIG. 5, i.e. there is not the difference that is shown in FIG. 4 below amplitude 0.4. While an occasional catastrophic error may not be significant in some applications, in others, such as in emergency response applications, such an error may be very important.

These results imply that if minimizing false alarms, and hence catastrophic errors, is a primary goal, then one method for determining noise subspace dimension is to estimate the statistics of the noise eigenvalues and set a threshold relative to this statistic providing a prescribed false alarm rate. As an example, one can measure the median of the set of eigenvalues (excluding the largest and perhaps second largest, for example), and then set a threshold relative to this median. If an exponential distribution represents a good model, then since such a distribution is a single parameter distribution, the use of the median for determining a threshold setting is adequate. In a more general manner this threshold approach consists of initially modeling the statistical distribution of noise eigenvalues, and then using this information together with the measured eigenvalue levels to establish a threshold above which are declared signal eigenvalues. Simulations by NextNav have shown that this approach appears to work quite well to establish a prescribed false alarm rate.

However, a problem with the above approach is that it may often declare a signal eigenvalue as a noise eigenvalue, thus missing the location of an early multipath return. Of course, this may be expected, due to the emphasis on low false alarm rate. However, this approach and more traditional approaches may benefit from yet another method that provides a secondary check on peaks that are determined in the superresolution algorithm. As described previously, such peaks may be spurious and may have resulted from a noise eigenvalue being declared a signal eigenvalue. The time of arrival associated with such a peak may be qualified by other measurements, called quality metrics, to determine if it should be retained or discarded. Such metrics may include additional time of arrival measurements, signal strength, signal to noise ratio, correlation width, etc. A combination of such metrics may be used as qualification.

For example, a coarse measure of time of arrival may be obtained by simply determining the location of the peak out of the matched filter associated with the despreader, for the spread spectrum embodiment discussed earlier. If the time of arrival found from the superresolution algorithm, called the "potential" time of arrival, occurs well before this coarse measure, then this potential time of arrival may be discarded as a false alarm, especially if the power associated with potential time of arrival is low enough. Such a power level may be that determined by the level of the associated eigenvalue, or may simply be the amplitude of the output of the matched filter at the potential time of arrival, relative to the maximum out of the matched filter, or relative to background noise. A more sophisticated approach would be to filter out peaks associated with potential times of arrival if they do not fall within a region that is a complex function of both time of arrival and signal strength.

Figure 6:
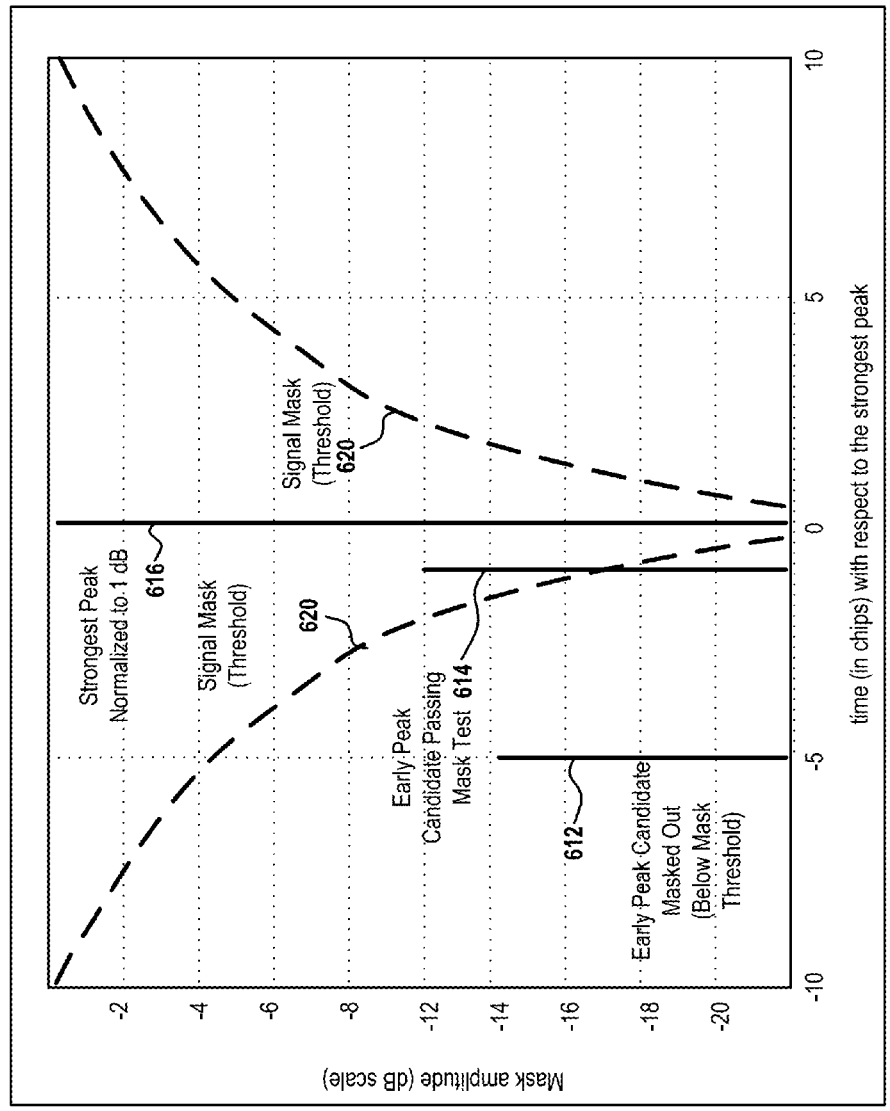
FIG. 6 illustrates an embodiment of a time of arrival peak mask for use in a receiver/user device.

In one embodiment, in embodiments using spread spectrum a "signal mask" may be applied to the despreader output to corroborate the existence of an early path at the time indicated by the superresolution algorithm. In this approach, a thresholding mask may be centered on a strongest peak in a received signal output such that the mask would begin at its lowest signal strength value at the center and attain a value equal to that of the strongest peak at a pre-determined distance away by rising at a pre-determined slope. For example, in one embodiment the mask may have an exponential characteristic, such as shown in FIG. 6 as curve 620, with a pre-determined exponent value. In this mask implementation, potential early path signals need to rise above the threshold in order to be considered viable direct path signals. Any potential early path needs to rise above the mask to be considered a viable candidate; it is discarded if it fails. As shown in FIG. 6, the mask is centered on peak signal value 616, while signal 612 is masked out because its amplitude is lower than the threshold defined by mask curve 620. Signal 614 has an amplitude above the mask threshold, so it may be selected as the direct path signal.

In effect, the mask imposes a lower limit on how strong an early path peak needs to be in the time domain as it occurs further away from the strongest peak. The value of the exponent used in implementations may be selected based on criteria such as simulation testing and/or operation system test data.

It should be noted that the possibility of false alarm exists even if the signal and noise subspace dimensions are determined exactly. This is due to dependence on the choice of an appropriate threshold value that distinguishes the multipath peaks in the MUSIC pseudospectrum from the rest of the noise floor. Often times, if the input to MUSIC is too noisy, the peaks do not stand out clearly and some of the noise peaks may pass the threshold test, thus posing as potential early arrival peaks. This can cause catastrophic errors in the position error as well and is preferably mitigated. In an exemplary embodiment, a variant of MUSIC known as Likelihood-MUSIC (as described in K. C. Sharman and T. S. Durrani, "A Comparative Study of Modern Eigenstructure Methods for Bearing Estimation—A New High Performance Approach.", Proceedings of the 25$^{th}$ conference on Decision and Control, Athens, Greece, December 1986), which may be used together with the other qualifying methods described above, may help reduce the risk due to an elevated noise floor. This variation serves the purpose of reducing the noise floor of the pseudospectrum by exploiting the fact that the noise belongs to a Gaussian distribution while the signal does not. The net result is that many fewer noise peaks in the modified pseudospectrum are able to pass the threshold test and pose as false early peaks.

As noted previously, an objective of various embodiments in accordance with aspects of the disclosure is to ameliorate the effects of false early peaks in applying superresolution algorithms to the multipath problem, that is, the mis-declaration of a noise eigenvalue and corresponding eigenvector as a signal, or the wrongful identification of a noise peak as an early signal peak in the pseudospectrum. As described above, amelioration may be done by (1) utilizing secondary checks upon the estimated signal eigenvalues/eigenvectors and/or by (2) using methods other than the information theoretic methods discussed above to determine which eigenvalues are declared noise eigenvalues. A more general object is to mitigate or prevent catastrophic errors that may occur in a variety of superresolution based time of arrival estimation procedures. This may be done by minimizing the occurrence of false peaks, such as is described subsequently.

In one embodiment (denoted as approach A), false peaks may be mitigated by determining the noise and signal subspace dimensions by using an appropriate algorithm, such as MDL, and then implementing a superresolution algorithm to estimate the times of arrival of the various signals from this algorithm and then choosing the earliest time of arrival. Once this is done, the location of the peak from the matched filter may be examined in order to determine a coarse estimate of time of arrival. This may be done in various ways.

Figure 7:
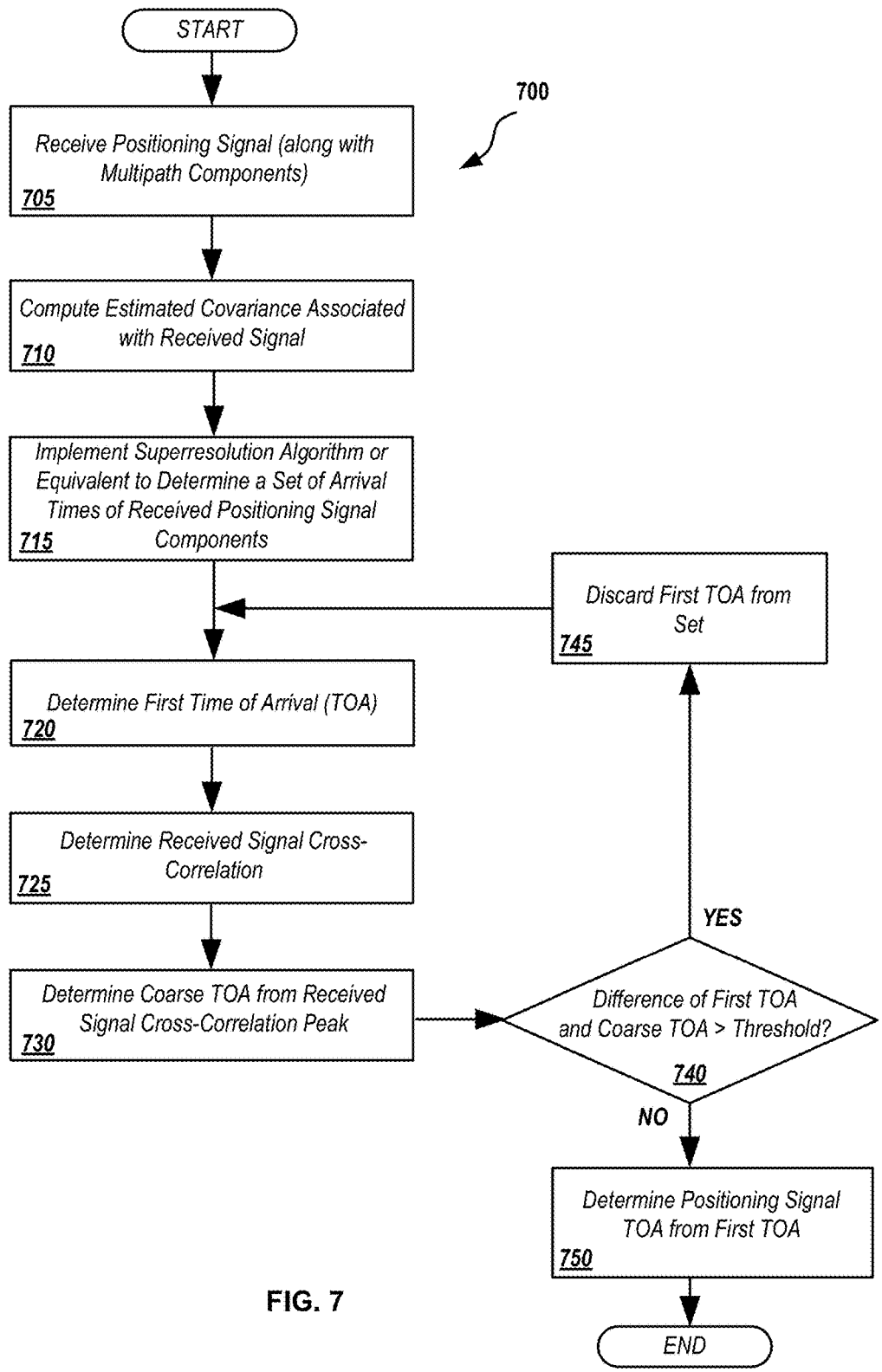
FIG. 7 illustrates an embodiment of a method for determining a distance estimate.

For example, in one exemplary embodiment, a lower window boundary may be set prior to this coarse estimate, and a determination made as to whether the time of arrival from the superresolution algorithm was within this window. If it occurred prior to the boundary then it may be discarded, and next earliest peak from the superresolution algorithm may be considered. This processing may be continued until a peak is found within this window. It is noted that the window boundary size may typically be set based upon physical limitations, such as the maximum multipath time spread that is likely to occur. An embodiment of a process 700 implementing this method is illustrated in FIG. 7. Process 700 may be implemented in a user device such as the receiver 120 of FIG. 1, which may be configured as shown in receiver embodiment 200 of FIG. 2. Process 700 may begin at stage 705 where a positioning signal is received. The positioning signal may include a direct path component and one or more multipath components. At stage 710, an estimated covariance associated with the received positioning signal may be determined. At stage 715, a superresolution algorithm or similar or equivalent algorithm may be implemented to determine a set of arrival times of the components of the received positioning signal components. At stage 720, a first time of arrival (TOA) of the signal components may be determined. At stage 725, a cross-correlation of the received signal may be done, and a coarse TOA may be determined at stage 730 from the peak of the received signal cross-correlation.

At decision stage 740, the difference between the first TOA and coarse TOA may be compared to a predetermined threshold value. If the difference is greater than the threshold, the processing may continue to stage 745, where the first TOA from the set of received signal components is discarded and stage 720 repeated to determine a new first TOA. Alternately, if the difference at stage 740 is less than the threshold value, processing may continue to stage 750, where the TOA estimate from the first TOA is assigned to be the estimated TOA for further processing. This TOA may subsequently be used to determine a distance from the transmitter to the receiver for further processing, such as for location triangulation based on positioning signals received from other transmitters.

Figure 8:
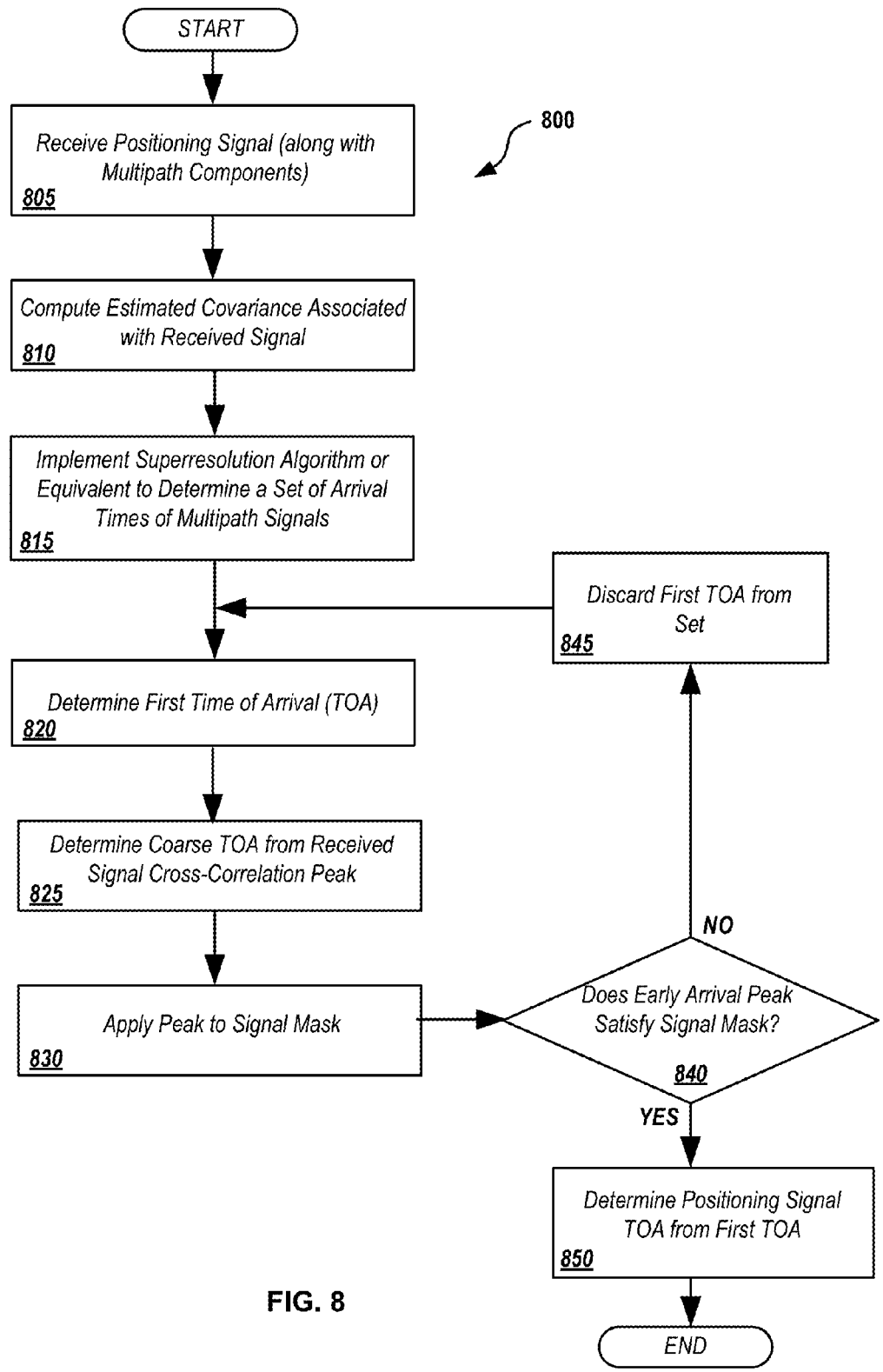
FIG. 8 illustrates an embodiment of a method for determining a distance estimate.

In another embodiment, a signal power versus delay mask may be derived whose slope is either one pre-determined value or a value derived from a set of pre-determined values stored in a database, and which is centered on the strongest peak at the despreader output. Once this is done, a check may be made to determine which of the candidates for the earliest arriving path satisfy the mask, and then the earliest path from the ones that do satisfy the mask may be selected. An embodiment of a process 800 implementing this method is illustrated in FIG. 8. Process 800 may be implemented in a user device such as the receiver 120 of FIG. 1, which may be configured as shown in receiver embodiment 200 of FIG. 2. Process 800 may begin at stage 805 where a positioning signal is received, which may be similar to process stage 705 of FIG. 7. The positioning signal may include a direct path component and one or more multipath components. At stage 810, an estimated covariance associated with the received positioning signal may be determined, which may be similar to process stage 710.

At stage 815, a superresolution algorithm or similar or equivalent algorithm may be implemented to determine a set of arrival times of the components of the received positioning signal components, which may be similar to process stage 715. At stage 820, a first time of arrival (TOA) of the signal components may be determined, which may be similar to process stage 720. At stage 825 a cross-correlation may be performed on the received signal and a coarse TOA may be determined from peaks of the cross-correlation, which may be done similarly to stages 725 and 730. However, at stage 830, a signal mask, such as shown in FIG. 6, may be applied to the peak values, and a decision stage 840 applied to the masked peak values. If the peak values are less than the mask threshold, processing may proceed to stage 845, where the first TOA estimate is discarded and processing is continued to stage 820 for determination of another first TOA estimate. Alternately, if the earliest peak value satisfies the mask criteria (i.e., exceeds a threshold value or other mask criteria), then processing may be continued to stage 850, where the TOA estimate from the earliest TOA satisfying the mask criteria is assigned to be the estimated TOA for further processing. This TOA value may subsequently be used to determine a distance from the transmitter to the receiver for further processing, such as for location determination based on positioning signals received from other transmitters.

In one embodiment (denoted as approach B), an algorithm based upon the statistics of the noise eigenvalues may be used to establish a detection threshold. This threshold may be set to achieve a prescribed false alarm rate. All eigenvalues below this threshold may be declared noise eigenvalues. This method may be used to mitigate, and potentially largely eliminate, catastrophic errors if the false alarm rate is set sufficiently high.

In another approach (denoted as approach C), a combination of the previously described approaches A and B may be implemented, depending upon estimated signal strength. For example below a prescribed SNR the MDL algorithm may be used, whereas above a prescribed SNR the approach in B may be used, or vice versa. In either case the secondary checks described above may be used. Simulations by some assignee NextNav have shown that a combination of algorithm may work better than either alone.

In some embodiments (denoted as approach D), the previously described methods may also be supplemented by Likelihood MUSIC to further avoid spurious noise peaks in the pseudospectrum from being designated as potential early arrival signal peaks.

Simulations and prototype testing, as well as trial runs on extensive field data, have shown that combination of approaches, such as C and D together with the second aspect of approach A can result in considerable improvements in position errors in difficult environments.

Figure 9:
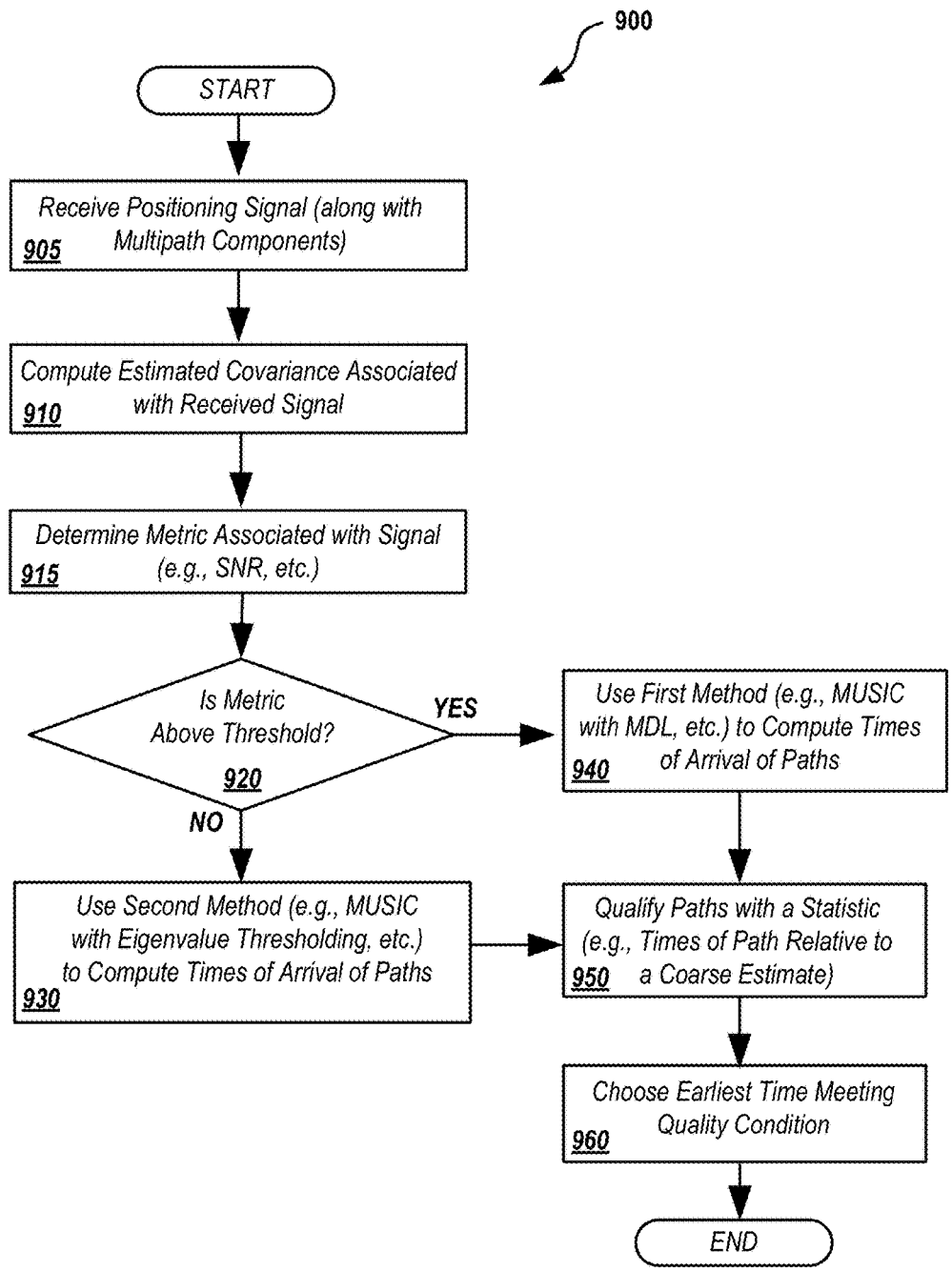
FIG. 9 illustrates an embodiment of a method for determining a distance estimate.
Figure 10:
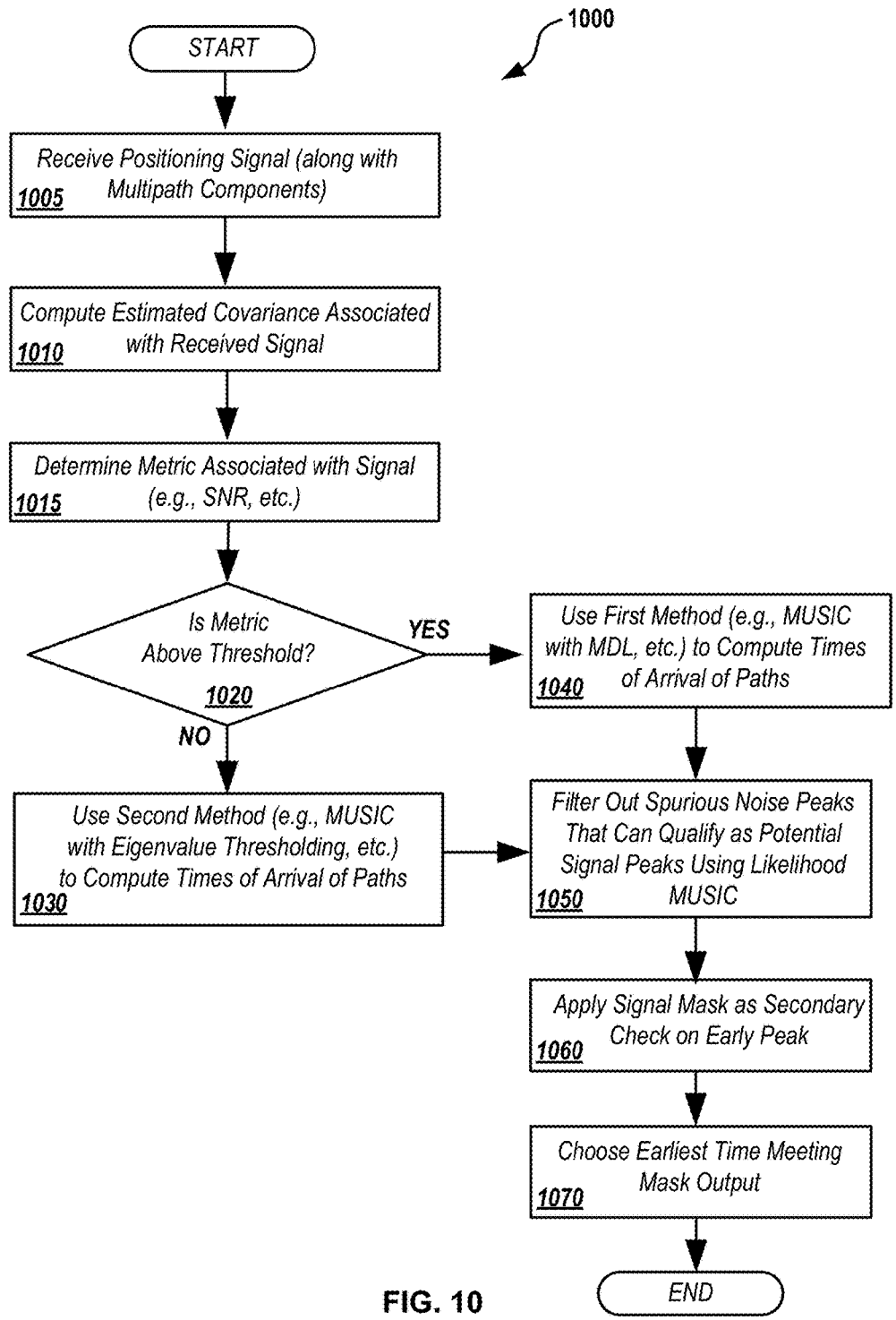
FIG. 10 illustrates an embodiment of a method for determining a distance estimate.

Approaches B, C, and D are illustrated in example embodiments shown in FIGS. 9 and 10. FIG. 9 illustrates an embodiment of a process 900 as may be used in a user device such as the receiver 120 of FIG. 1. Process 900 may be implemented in a receiver architecture such as shown in FIG. 2. At stage 905, at least one of a direct path signal component and one or more multipath signal components may be received. At stage 910, an estimated covariance of the received signal may be determined, and the value of a metric associated with the signal determined at stage 915. At decision stage 920, the metric value may be compared to a threshold. If the metric value is below the threshold processing may continue to stage 930 where a second method may be used to compute times of arrival of the various components. Alternately, if the metric value is above the threshold at stage 920, a first method may be used to compute times of arrival paths.

At stage 950, the paths may be qualified with a statistic, such as times relative to a coarse time of arrival, and at stage 960 the earliest path to meet the quality condition may be selected as the direct path TOA. This TOA may then be used for distance and/or location determination of the receiver.

FIG. 10 illustrates an embodiment of an alternate process 1000 as may be used in a user device such as the receiver 120 of FIG. 1. Process 1000 may likewise be implemented in a receiver architecture such as shown in FIG. 2. At stage 1005 at least one of a direct path signal component and one or more multipath signal components may be received. At stage 1010, an estimated covariance of the received signal may be determined, and a metric value associated with the signal determined at stage 1015. At decision stage 1020, the value of a metric may be compared to a threshold. If the metric value is below the threshold, processing may continue to stage 1030 where a second method may be used to compute times of arrival of the various components. Alternately, if the metric value is above the threshold at stage 1020, a first method may be used to computer times of arrival paths.

At stage 1050, spurious noise peaks may be filtered out using a Likelihood MUSIC algorithm or similar or equivalent algorithm. At stage 1060, a signal mask may then be applied to the remaining peaks as a secondary check, and at stage 1070 the earliest peak meeting the mask criteria may be selected for the direct path TOA. This TOA may then be used for distance and/or location determination of the receiver.

Figure 11:
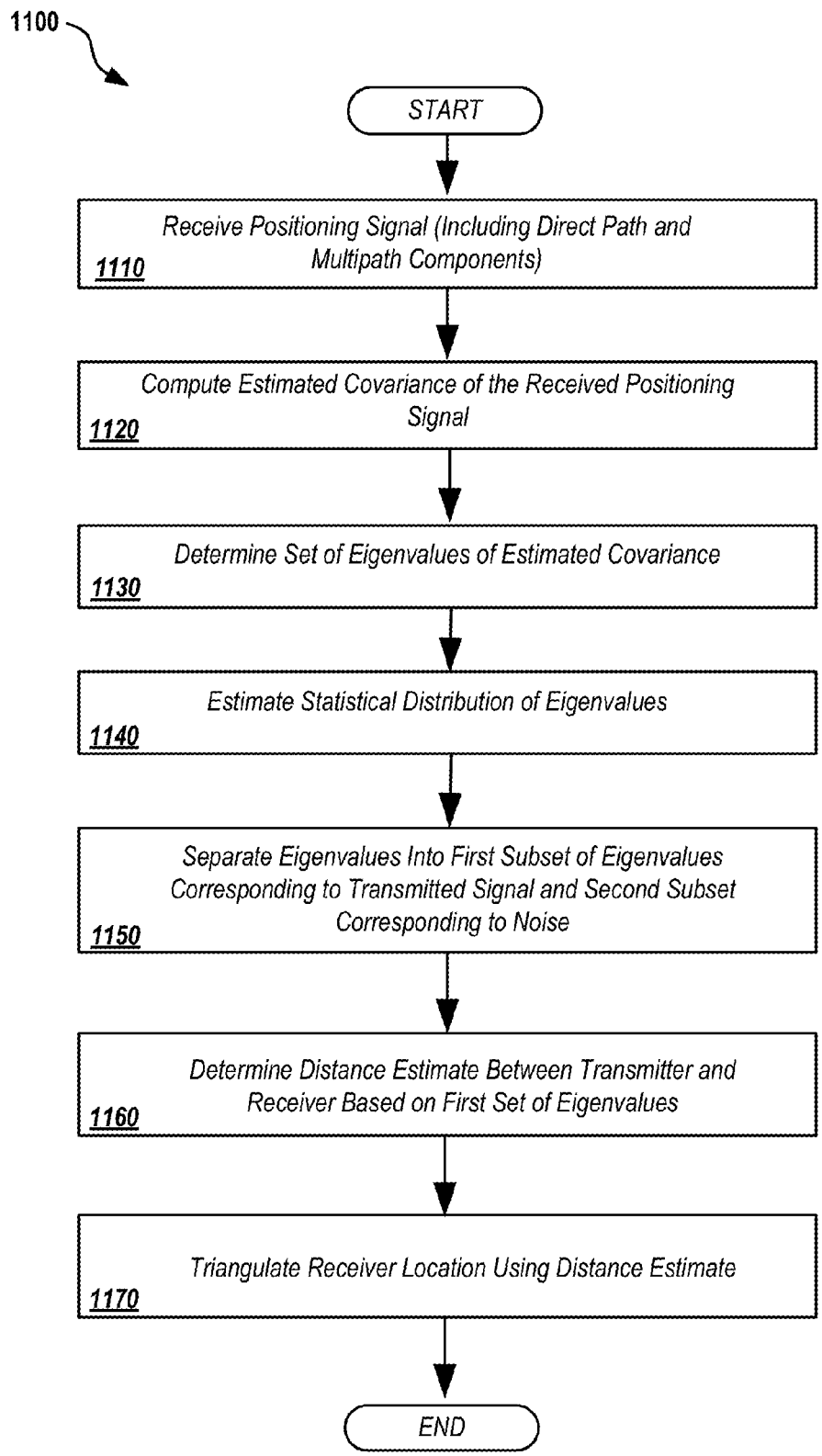
FIG. 11 illustrates an embodiment of a method for determining a location of a positioning system receiver.

FIG. 11 illustrates details of an embodiment of a process 1100 for determining a distance estimate from a transmitter to a receiver in a positioning system such as the WAPS system shown in FIG. 1. Process 1100 may begin at stage 1110, where a positioning signal is received from a transmitter. The received positioning signal may include a direct path signal component as well as one or more multipath signal components. The direct path signal component may be stronger than the multipath signal components in some environments. Alternately, one or more of the multipath signal components may be stronger than the direct path signal component. The direct and multipath components may heavily overlap one another in times of arrival at a receiver. At stage 1120, estimated covariance of the received positioning signal may be computed. At stage 1130, a set of eigenvalues of the estimated covariance may be determined, and at stage 1140, a statistical distribution of the eigenvalues may be estimated. At stage 1150, the set of eigenvalues may be separated, such as based on a threshold, into a first subset of eigenvalues corresponding to a transmitted signal including the direct path signal component and the multipath signal components, and a second set of eigenvalues corresponding to noise components. The threshold may be based at least in part on the estimated statistical distribution. At stage 1160, the first set of eigenvalues may be used to estimate a time of arrival of the direct path signal component, and a distance estimate between the transmitter and receiver may be implemented based at least in part on the first subset of eigenvalues and associated eigenvectors. At stage 1170, a location of the receiver may be determined. For example, the location may be determined by using the distance estimate along with additional distance estimates or other information in a triangulation calculation or other location calculation.

One eigenvalue and associated eigenvector of the first set of eigenvalues may be selected as corresponding to the direct path signal component, which may be used to determine the estimated time of arrival. The distance estimate may be determined based at least in part on the estimated time of arrival. The process 1100 may further include determining, based in part on the distance estimate, a location of the receiver. The method may further include providing the determined location as an output. The output may be sent/transmitted from the receiver to a wired or wireless communications network, such as a cellular or data network. The communications network may be an emergency response network. The output may be sent to another device or system on the communications network. The output may be provided on an audio output or visual display of the receiver.

Figure 12:
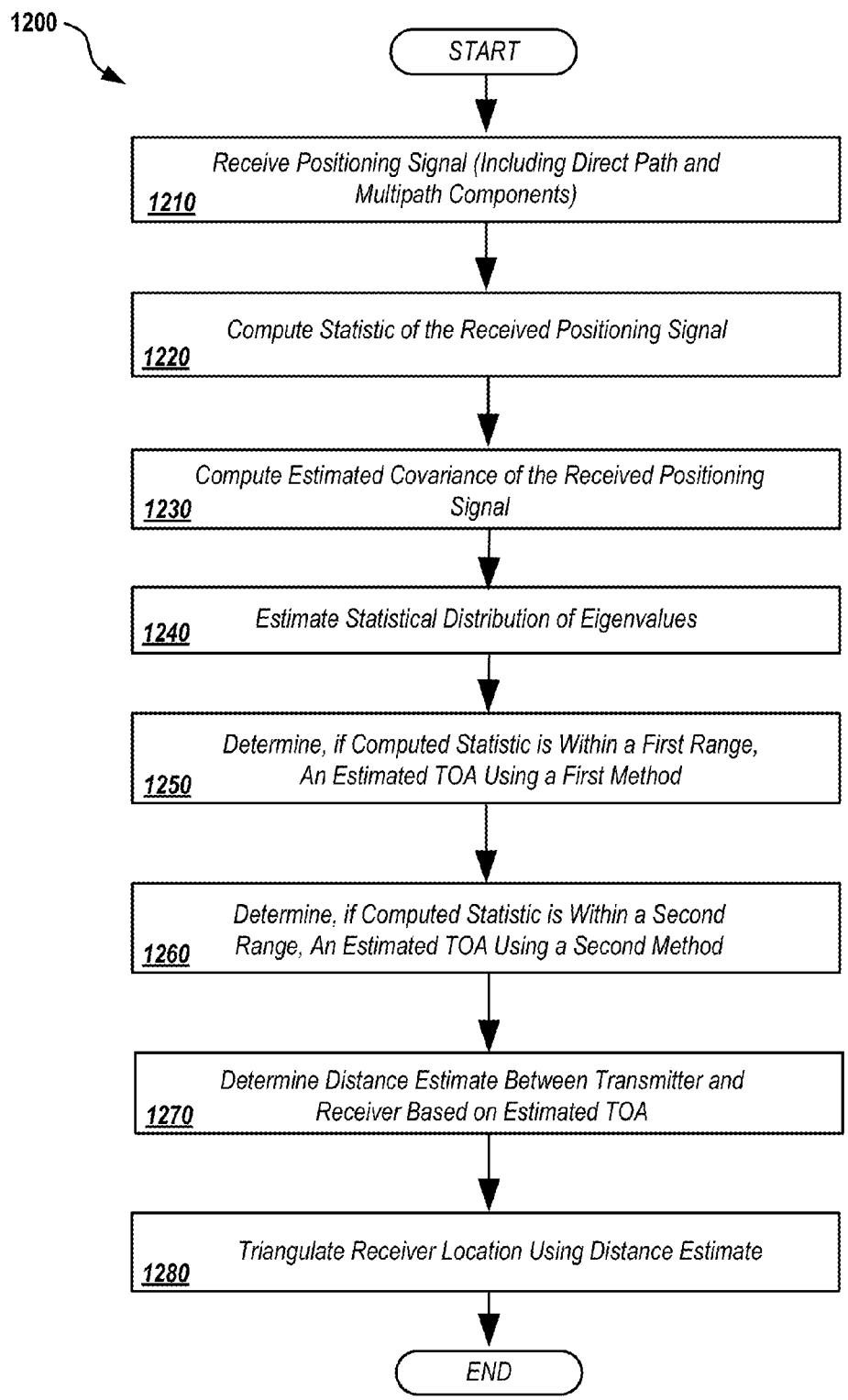
FIG. 12 illustrates an embodiment of a method for determining a location of a positioning system receiver.

FIG. 12 illustrates details of an embodiment of a process 1200 for determining a distance estimate from a transmitter to a receiver in a positioning system such as the WAPS system shown in FIG. 1. Process 1200 may begin at stage 1210, where a positioning signal is received from a transmitter. The positioning signal may include a direct path signal component and one or more multipath signal components. The direct path signal component may be stronger than the multipath signal components in some environments. Alternately, one or more of the multipath signal components may be stronger than the direct path signal component. The direct and multipath components may heavily overlap one another in times of arrival at a receiver. At stage 1220, a statistic of the received positioning signal may be determined. At stage 1230, an estimated covariance of the received positioning signal may be determined, and at stage 1240, an estimate of the statistical distribution of eigenvalues may be determined. At stage 1250, if the statistic is within a first range, an estimated time of arrival of the direct path signal may be determined using a first method. Alternately, at stage 1260, if the statistic is within a second range, an estimated time of arrival of the direct path signal may be determined using a second method. The second method may be different from the first method. At stage 1270, a distance estimate between the transmitter and receiver may be determined based on the estimated TOA from stage 1250 or stage 1260. At stage 1280, a location of the receiver may be determined. For example, the location may be determined by using the distance estimate along with additional distance estimates or other information in a triangulation calculation or other location calculation.

The first method may, for example, include use of an information theoretic criterion for estimating a number of eigenvalues associated with a signal subspace of the estimated covariance. The estimated time of arrival may be based on a selected one of the eigenvalues. The first or second method may include use of a statistic of the estimated covariance to estimate a number of eigenvalues in a positioning signal subspace of the estimated covariance, wherein the estimated time of arrival is based on a selected one of the eigenvalues. The statistic may be a measure of a signal-to-noise ratio of the received positioning signal. The process 1200 may further include determining, based in part on the distance estimate, a location of the receiver, and providing the determined location as an output. The output may be sent/transmitted from the receiver to a wired or wireless communications network, such as a cellular or data network. The communications network may be an emergency response network. The output may be sent to another device or system on the communications network. The output may be provided on an audio output or visual display of the receiver.

Figure 13:
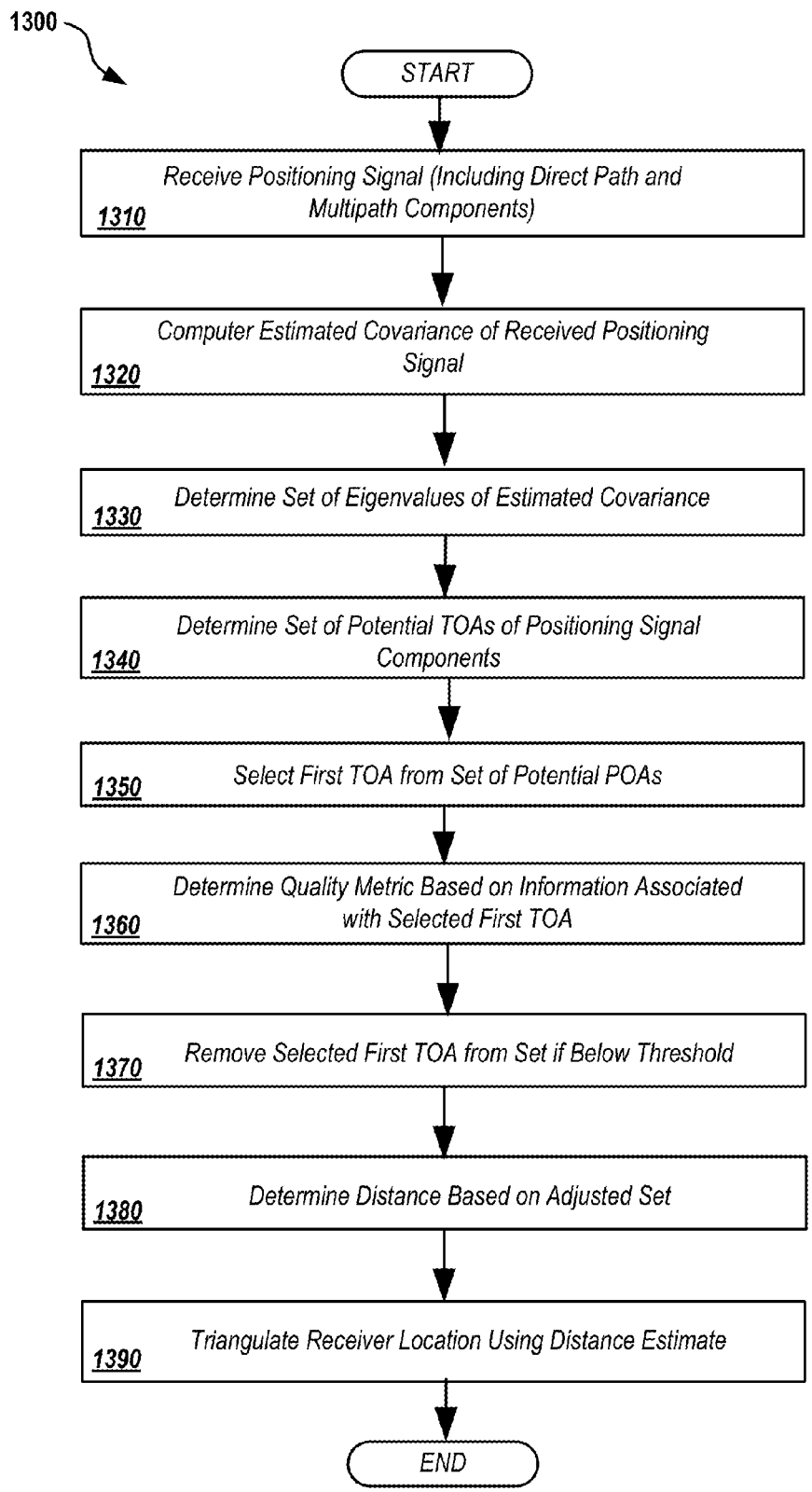
FIG. 13 illustrates an embodiment of a method for determining a location of a positioning system receiver.

FIG. 13 illustrates details of an embodiment of a process 1300 for determining a distance estimate from a transmitter to a receiver in a positioning system such as the WAPS system shown in FIG. 1. Process 1300 may begin at stage 1310, where a positioning signal is received from a transmitter. The positioning signal may include a direct path signal and one or more multipath signals. The direct path signal may be stronger than the multipath signal in some environments. Alternately, one or more of the multipath signals may be stronger than the direct path signal. The direct and multipath components may heavily overlap one another in times of arrival at a receiver. At stage 1320, an estimated covariance of the received positioning signal may be determined, and at stage 1330 a set of eigenvalues of the estimated covariance may be determined. At stage 1340, a set of potential times of arrival of the positioning signal components, and at stage 1350, a first time of arrival value from the set of potential times of arrival may be selected. At stage 1360, a quality metric value, which may be based on information associated with the selected first time of arrival, may be selected. At stage 1370, the selected first time of arrival from the set of potential times of arrival may be removed from the set if the quality metric value is below a predefined threshold, and an adjusted set of potential times of arrival may be generated without the removed value. If estimated first TOAs are removed, the processing may include repeating the selecting, determining a value of a quality metric, and removing additional selected first times of arrival until the quality metric value of a selected first TOA value from the set is above the predefined threshold. At stage 1380, a distance between the transmitter and receiver may be determined from the adjusted set of potential times of arrival, and at stage 1390, a location of the receiver may be determined. For example, the location may be determined by using the distance estimate along with additional distance estimates or other information, in a triangulation calculation or other location calculation.

The quality metric may, for example, include a measure of the time of arrival difference between the selected first time of arrival and an estimate of the time of arrival of the positioning signal. The measure may be based at least in part upon the location of a time domain cross-correlation peak. The method may include implementation of a Likelihood MUSIC algorithm to determine a set of early arrival peaks from the pseudospectrum. The quality metric may be determined based on a decision as to whether or not the correlation peak associated with the selected first time of arrival falls within a signal power versus delay mask, relative to the location and power of the strongest correlation peak. The quality metric may include a measure of the strength of a signal associated with the selected first time of arrival relative to a measure of noise.

The process 1300 may further include, for example, determining, based in part on the distance estimate, a location of the receiver, and providing the determined location as an output. The output may be sent/transmitted from the receiver to a wired or wireless communications network, such as a cellular or data network. The communications network may be an emergency response network. The output may be sent to another device or system on the communications network. The output may be provided on an audio output or visual display of the receiver. For example, the location of the receiver may be determined based on a triangulation of the distance estimate determined from the transmitter and additional distance estimates determined from two or more additional transmitters.

The above examples have been provided for illustrative purposes and various extensions to the teachings herein may also be implemented in various embodiments. The inventive concepts herein have been described and illustrated in the context of wide area positioning systems (WAPS), but may also be applied to local area positioning systems, such as in building location systems or other similar or equivalent systems. When referring to position location systems, it is also understood herein that this includes distance measurement, or the measurement of the time-of-arrival of a single signal, when such a time-of-arrival is used in some type of position location calculation. It is also noted that the methods described herein may be applied to both forward and inverse positioning systems as well as to round trip time measurement systems or other systems using signal propagation times for distance measurement.

EXAMPLE METHODOLOGIES

Functionality and operation disclosed herein may be embodied as one or more methods implemented by processor(s) at one or more locations. Non-transitory processor-readable media embodying program instructions adapted to be executed to implement the method(s) are also contemplated. The program instructions may be contained in at least one semiconductor chip.

Functionality of methods disclosed herein may be based on positioning signals received from an RF module of a receiver.

By way of example, not by way of limitation, any number of method(s) may comprise: receiving a positioning signal from a transmitter, wherein the received positioning signal includes a direct path signal component and one or more multipath signal components; determining an estimated covariance of the received positioning signal; determining a set of eigenvalues of the estimated covariance; estimating a statistical distribution of the eigenvalues; separating, based on a threshold derived at least in part from the estimated statistical distribution, the set of eigenvalues into a first subset of eigenvalues corresponding to a transmitted signal including the direct path signal component and one or more multipath signal components, and a second set of eigenvalues corresponding to noise components; and determining, based at least in part on the separation of the eigenvalues into the two sets, a distance estimate between the transmitter and the receiver. The first set of eigenvalues and associated eigenvectors (corresponding with the estimated transmitted signal) may be used to estimate distance. In a complementary implementation, the second set of eigenvalues and associated eigenvectors (corresponding with the estimated noise) may be used to estimate the distance. The two sets of eigenvalues and associated eigenvectors may be used to estimate a time of arrival of the direct path signal component. In accordance with some aspects, one eigenvalue and the corresponding vector of the first set of eigenvalues corresponds to the direct path signal component. In accordance with some aspects, the distance estimate is determined based on the time of arrival. Method(s) may further or alternatively comprise: determining, based in part on the distance estimate, a location of the receiver; and providing the determined location as an output. In accordance with some aspects, the output is sent from the receiver to a communications network. In accordance with some aspects, the communications network is an emergency response network. In accordance with some aspects, the output is provided on an audio output or visual display of the receiver. In accordance with some aspects, the location of the receiver is determined based on a triangulation of the distance estimate determined from the transmitter and additional distance estimates determined from two or more additional transmitters.

By way of example, not by way of limitation, any number of method(s) may comprise: receiving a positioning signal from a transmitter, wherein the received positioning signal includes a direct path signal component and one or more multipath signal components; determining a statistic of the received positioning signal; determining an estimated covariance of the received positioning signal; determining, if the statistic is within a first range, an estimated time of arrival of the direct path signal component using a first method; determining, if the statistic is within a second range, an estimated time of arrival of the direct path signal component using a second method; and determining, based at least in part on the estimated time of arrival, a distance estimate between the transmitter and the receiver. In accordance with some aspects, the first method comprises use of an information theoretic criteria for estimating a number of eigenvalues associated with a positioning signal subspace of the estimated covariance. The first method and second method may, for example, be chosen from a set of at least two different methods. The methods may be chosen is based at least in part upon a computation of a statistic associated with the received positioning signal. The statistic may be a measure of the signal-to-noise ratio of the positioning signal. In accordance with some aspects, the first method comprises use of a statistic of the estimated covariance to estimate a number of eigenvalues in a positioning signal subspace of the estimated covariance. In accordance with some aspects, the second method comprises use of a statistic of the estimated covariance to estimate a number of eigenvalues in a positioning signal subspace of the estimated covariance. In accordance with some aspects, the statistic is a measure of a signal-to-noise ratio of the received positioning signal. Method(s) may further or alternatively comprise: determining, based in part on the distance estimate, a location of the receiver; and providing the determined location as an output. In accordance with some aspects, the output is sent from the receiver to a communications network. In accordance with some aspects, the communications network is an emergency response network. In accordance with some aspects, the output is provided on an audio output or visual display of the receiver. In accordance with some aspects, the location of the receiver is determined based on a triangulation of the distance estimate determined from the transmitter and additional distance estimates determined from two or more additional transmitters.

By way of example, not by way of limitation, any number of method(s) may comprise: receiving a positioning signal from a transmitter, wherein the received positioning signal includes a direct path signal and one or more multipath signals; determining an estimated covariance of the received positioning signal; determining a set of eigenvalues of the estimated covariance (or, in other embodiments, determining a set of eigenvalues and eigenvectors—so-called eigenvalue decomposition—of the estimated covariance); determining a set of potential times of arrival of the positioning signal components; selecting a first time of arrival value from the set of potential times of arrival; determining the value of a quality metric based on information associated with the selected first time of arrival; removing the selected first time of arrival from the set of potential times of arrival if the quality metric value is below a predefined threshold to generate an adjusted set of potential times of arrival (and, in other embodiments, repeating the selecting, determining the value of a quality metric, and removing additional selected first times of arrival until the quality metric value is above the predefined threshold); and determining a distance between the transmitter and receiver from the adjusted set of potential times of arrival. In accordance with some aspects, the quality metric is a function of the time of arrival difference between the selected first time of arrival and an estimate of the time of arrival of the positioning signal based at least in part upon the location of a time domain cross-correlation peak. Method(s) may further or alternatively comprise: implementing a Likelihood MUSIC algorithm to determine a set of early arrival peaks from the pseudospectrum. In accordance with some aspects, the quality metric is determined based on a decision as to whether or not the correlation peak associated with the selected first time of arrival falls within a signal power versus delay mask, relative to the location and power of the strongest correlation peak. In accordance with some aspects, the quality metric comprises a measure of the strength of a signal associated with the selected first time of arrival relative to a measure of noise. Method(s) may further or alternatively comprise: determining, based in part on the distance estimate, a location of the receiver; and providing the determined location as an output. In accordance with some aspects, the output is sent from the receiver to a communications network. In accordance with some aspects, the communications network is an emergency response network. In accordance with some aspects, the output is provided on an audio output or visual display of the receiver. In accordance with some aspects, the location of the receiver is determined based on a triangulation of the distance estimate determined from the transmitter and additional distance estimates determined from two or more additional transmitters.

This disclosure includes devices, modules, and systems for implementing the above-described methods, in whole or in part. This disclosure includes means for implementing the above-described methods, in whole or in part. This disclosure includes processor/computer-readable media including instructions for causing a programmable device such as a general or special purpose processor, computer, other processing or other computing device or system to implement or control the above-described methods, in whole or in part. This disclosure includes a positioning system receiver that may include an RF module for receiving the positioning signal(s) of the above methods, an output module for providing the distance estimate as an output, and a processing module for performing other steps of the methods. Location information determined using the above methods can be stored and/or provided as output to a user or other electronic computing system or device—e.g. the output may be sent/transmitted from the receiver to a wired or wireless communications network (e.g. a cellular or data network, an emergency response network), and may be sent to another device or system on the communications network; e.g. the output may be provided on an audio output or visual display of the receiver. Any portion of the functionality embodied in the method(s) above may be combined with any other portion of that functionality.

OTHER ASPECTS

The various components, modules, and functions described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry in one or more processing elements or modules, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above. The elements and acts of the various embodiments described above can be combined to provide further embodiments. These and other changes can be made to the systems and methods in light of the above detailed description.

In one or more exemplary embodiments, the functions, methods and processes described may be implemented in whole or in part in hardware, software, firmware, or any combination thereof in one or more processing elements or modules or other elements or modules as described herein. If implemented in software, the functions may be stored on or encoded as one or more instructions or code on a computer-readable medium. Computer-readable media includes computer storage media. Storage media may be any available media that can be accessed by a computer. If implemented in firmware, the functions may be stored on or encoded on a chip. In some embodiments, functions may be implemented via a processor-readable medium that includes instructions for causing a processing element to carry out the functions.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Also contemplated is non-transitory processor-readable medium having processor readable program code (e.g., instructions) embodied therein that is adapted to be executed to implement any number of the various methods disclosed herein. Processor-readable media be any available storage media, including non-volatile media (e.g., optical, magnetic, semiconductor).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, processes, and circuits described in connection with the embodiments disclosed herein may be implemented or performed in a processing element or module or other element or module with a general purpose processor, a special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the disclosure is not intended to be limited to the aspects shown herein, but is to be accorded the full scope consistent with the description herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the scope is not intended to be limited to the aspects shown herein but is to be accorded the widest scope consistent with the disclosed aspects and their equivalents.

The invention claimed is:

1. A method for determining location information associated with a receiver, the method comprising:
receiving information related to at least one of a direct path signal component or one or more multipath signal components associated with a positioning signal received by a receiver from a transmitter;
determining, using one or more processors, an estimated covariance of the positioning signal;
determining, using the one or more processors, a set of eigenvalues of the estimated covariance;
retrieving an estimated probability density associated with the set of eigenvalues, said estimated probability density having been obtained by combining a multiplicity of sets of eigenvalues of estimated covariances associated with a multiplicity of positioning signals;
separating, based on a threshold determined at least in part from the estimated probability density, the set of eigenvalues into a first subset of eigenvalues corresponding to the at least one of the direct path signal component or the one or more multipath signal components, and a second subset of eigenvalues corresponding to noise; and
determining, based at least in part on the separation of the set of eigenvalues into the first and second subsets, a distance between the transmitter and the receiver.

2. The method of claim 1, wherein one eigenvalue, within the first subset of eigenvalues, and a corresponding eigenvector are associated with the direct path signal component.

3. The method of claim 2, wherein the distance is determined based on a time of arrival of the direct path signal component.

4. The method of claim 1, the method comprising:
determining an estimated location of the receiver, wherein the estimated location of the receiver is determined based on the determined distance and additional distances associated with two or more additional transmitters.

5. One or more non-transitory processor-readable media embodying program instructions that, when executed by one or more processors, cause the one or more processors to implement a method for determining location information associated with a receiver, the method comprising:
receiving information related to at least one of a direct path signal component or one or more multipath signal components associated with a positioning signal received by a receiver from a transmitter;
determining an estimated covariance of the positioning signal;
determining a set of eigenvalues of the estimated covariance;
retrieving an estimated probability density associated with the set of eigenvalues, said estimated probability density having been obtained by combining a multiplicity of sets of eigenvalues of estimated covariances associated with a multiplicity of positioning signals;
separating, based on a threshold determined at least in part from the estimated probability density, the set of eigenvalues into a first subset of eigenvalues corresponding to the at least one of the direct path signal component or the one or more multipath signal components, and a second subset of eigenvalues corresponding to noise; and
determining, based at least in part on the separation of the set of eigenvalues into the first and second subsets, a distance between the transmitter and the receiver.

6. The one or more non-transitory processor-readable media of claim 5, wherein one eigenvalue, within the first subset of eigenvalues, and a corresponding eigenvector are associated with the direct path signal component.

7. The one or more non-transitory processor-readable media of claim 6, wherein the distance is determined based on a time of arrival of the direct path signal component.

8. The one or more non-transitory processor-readable media of claim 5, the method comprising:
determining an estimated location of the receiver, wherein the estimated location of the receiver is determined based on the determined distance and additional distances associated with two or more additional transmitters.

9. A system for determining location information associated with a receiver, the system comprising:
means, implemented in hardware, for receiving a positioning signal comprising at least one of a direct path signal component or one or more multipath signal components from a transmitter;
means, implemented in hardware, for determining an estimated covariance of the positioning signal;
means, implemented in hardware, for determining a set of eigenvalues of the estimated covariance;
means, implemented in hardware, for retrieving an estimated probability density associated with the set of eigenvalues, said estimated probability density having been obtained by combining a multiplicity of sets of eigenvalues of estimated covariances associated with a multiplicity of positioning signals;
means for separating, based on a threshold determined at least in part from the estimated probability density, the set of eigenvalues into a first subset of eigenvalues corresponding to the at least one of the direct path signal component or the one or more multipath signal components, and a second subset of eigenvalues corresponding to noise; and
means for determining, based at least in part on the separation of the set of eigenvalues into the first and second subsets, a distance between the transmitter and the receiver.

10. The system of claim 9, wherein one eigenvalue, within the first subset of eigenvalues, and a corresponding eigenvector are associated with the direct path signal component.

11. The system of claim 10, wherein the distance is determined based on a time of arrival of the direct path signal component.

12. The system of claim 9, the system comprising:
means for determining an estimated location of the receiver, wherein the estimated location of the receiver is determined based on the determined distance and additional distances associated with two or more additional transmitters.

13. The system of claim 9, wherein one or more processors are the means for determining an estimated covariance of the positioning signal, the means for determining a set of eigenvalues of the estimated covariance, the means for estimating a probability density of the set of eigenvalues, the means for separating, and the means for determining the distance between the transmitter and the receiver.

14. The system of claim 12, wherein one or more processors are the means for determining an estimated covariance of the positioning signal, the means for determining a set of eigenvalues of the estimated covariance, the means for estimating a probability density of the set of eigenvalues, the means for separating, the means for determining the distance between the transmitter and the receiver, and the means for determining an estimated location of the receiver.

* * * * *